US008427666B2

(12) United States Patent
Ohshima et al.

(10) Patent No.: US 8,427,666 B2
(45) Date of Patent: Apr. 23, 2013

(54) ABNORMALITY DETECTING DEVICE FOR ROTATION BODY AND IMAGE FORMING APPARATUS

(75) Inventors: Minoru Ohshima, Ashigarakami-gun (JP); Takao Furuya, Ebina (JP); Yoshinari Iwaki, Ebina (JP); Michio Taniwaki, Ebina (JP)

(73) Assignee: Fuji Xerox Co., Ltd, Tokyo (JP)

( * ) Notice: Subject to any disclaimer, the term of this patent is extended or adjusted under 35 U.S.C. 154(b) by 491 days.

(21) Appl. No.: 12/868,319

(22) Filed: Aug. 25, 2010

(65) Prior Publication Data

US 2011/0176159 A1 Jul. 21, 2011

(30) Foreign Application Priority Data

Jan. 15, 2010 (JP) ................................ 2010-007170

(51) Int. Cl.
*G06F 15/00* (2006.01)
*G06K 1/00* (2006.01)
*G06K 15/00* (2006.01)
*G06F 3/12* (2006.01)

(52) U.S. Cl.
USPC ........................................ 358/1.14; 358/1.13

(58) Field of Classification Search ........................ None
See application file for complete search history.

(56) References Cited

U.S. PATENT DOCUMENTS 7,427,061 B2 9/2008 Ruthenberg et al.
2003/0020423 A1 * 1/2003 Kameyama .................. 318/560
2006/0275056 A1 * 12/2006 Matsuda et al. ............. 399/301
2008/0073825 A1 3/2008 Ruthenberg et al.
2009/0079999 A1 3/2009 Suzuki

FOREIGN PATENT DOCUMENTS

JP A-6-158577 6/1994
JP A-2003-171035 6/2003
JP A-2008-74626 4/2008
JP A-2009-78376 4/2009

* cited by examiner

*Primary Examiner* — Douglas Tran
(74) *Attorney, Agent, or Firm* — Oliff & Berridge, PLC

(57) ABSTRACT

An abnormality detecting device for a rotation body includes: a rotation body rotating while coming in contact with a sheet transported at a predetermined speed; an output unit outputting pulses of a number in proportion to a rotation amount of the rotation body; an acquisition unit acquiring periodic information associating a position of the rotation body during a single rotation and a period of each of the pulses corresponding to the position with each other, the periodic information being acquired based on the plural pulses outputted from the output unit along with the rotation of the rotation body at the predetermined speed; a memory storing the periodic information as reference periodic information; and an abnormality detector detecting an abnormality occurred in at least one of the rotation body and the output unit based on the reference periodic information and new periodic information acquired after the reference periodic information is acquired.

20 Claims, 16 Drawing Sheets

ABNORMALITY DETECTING DEVICE FOR ROTATION BODY AND IMAGE FORMING APPARATUS

CROSS REFERENCE TO RELATED APPLICATIONS

This application is based on and claims priority under 35 USC §119 from Japanese Patent Application No. 2010-007170 filed Jan. 15, 2010.

BACKGROUND

1. Technical Field

The present invention relates to an abnormality detecting device for a rotation body and an image forming apparatus.

2. Related Art

Recently, a printer or a copying machine which is capable of detecting a transport speed of a recording medium or a length in a transport direction of a recording medium using a rotation body has been known.

SUMMARY

According to an aspect of the present invention, there is provided an abnormality detecting device for a rotation body including: a rotation body that rotates while coming in contact with a sheet being transported at a predetermined speed; an output unit that outputs pulses of a number in proportion to an amount of rotation of the rotation body along with the rotation thereof; an acquisition unit that acquires periodic information in which a position of the rotation body during a single rotation thereof and a period of each of the pulses corresponding to the position are associated with each other, the periodic information being acquired based on the plural pulses outputted from the output unit along with the rotation of the rotation body at the predetermined speed; a memory that stores the periodic information acquired by the acquisition unit as reference periodic information; and an abnormality detector that detects an abnormality occurred in at least one of the rotation body and the output unit based on the reference periodic information read from the memory and new periodic information that is acquired after the reference periodic information is acquired.

BRIEF DESCRIPTION OF THE DRAWINGS

An exemplary embodiment of the present invention will be described in detail based on the following figures, wherein.

DETAILED DESCRIPTION

Hereinafter, an exemplary embodiment according to the present invention will be described in detail with reference to the accompanying drawings.

Figure 1:
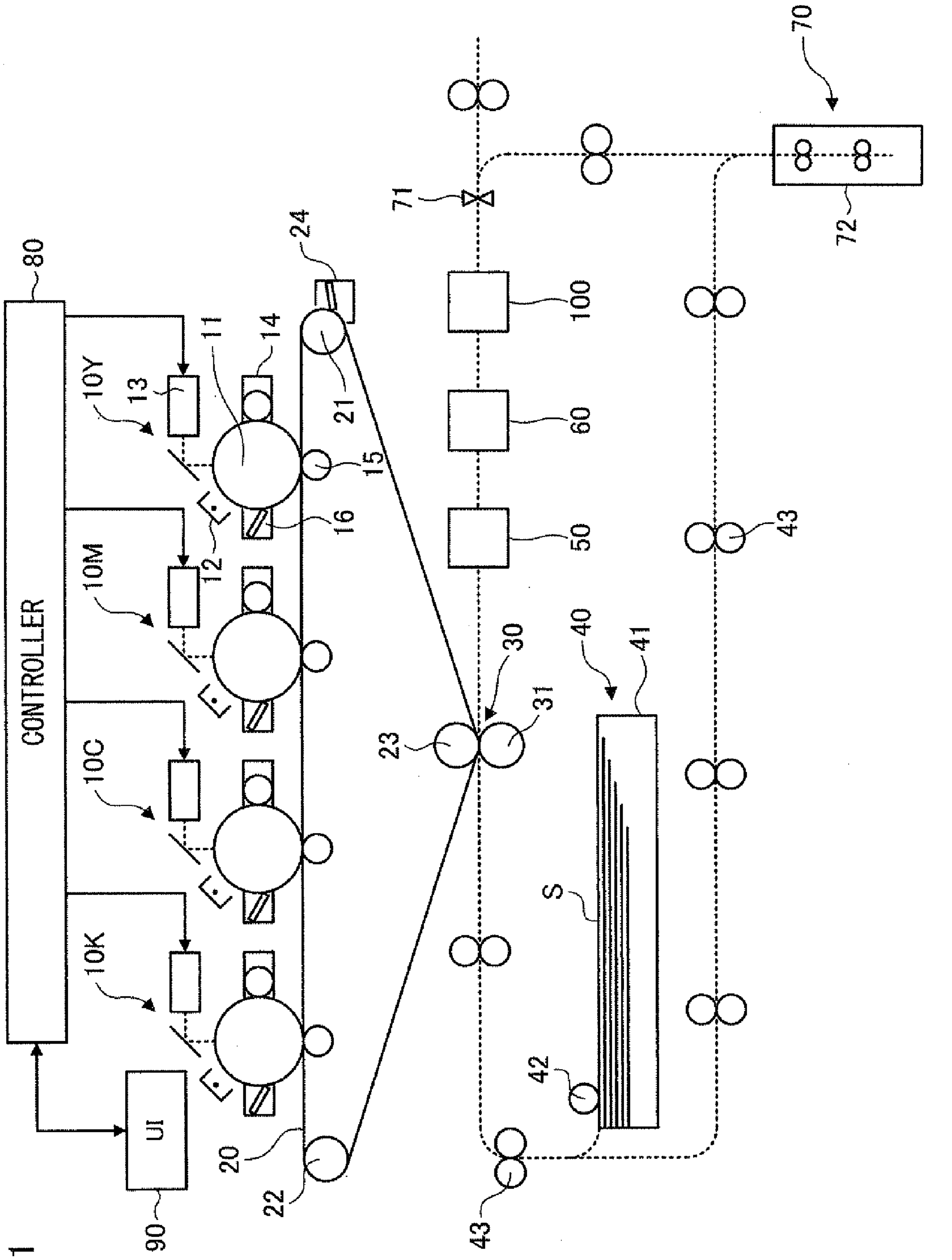
FIG. 1 is a schematic block diagram illustrating an example of an image forming apparatus to which an exemplary embodiment is applied.

FIG. 1 is a schematic block diagram illustrating an example of an image forming apparatus to which an exemplary embodiment is applied.

The image forming apparatus shown in FIG. 1 has a configuration of a so-called “tandem-type” and includes plural image forming units 10 (10Y, 10M, 10C and 10K) in which toner images of respective colors are formed by, for example, an electrophotographic system. The image forming apparatus also includes an intermediate transfer belt 20 on which the toner images of the respective color components formed by the respective image forming units 10 as an example of an image forming unit are sequentially transferred (primarily transferred) and retained, and a secondary transfer device 30 that collectively transfers (secondary transfers) the superimposed image having been transferred on the intermediate transfer belt 20 onto a recording medium S. Further, the image forming apparatus includes a recording medium supplier 40 that supplies the recording medium S to the secondary transfer device 30, a fixing device 50 that fixes the image having been secondarily transferred by the secondary transfer device 30, onto the recording medium S with heat and pressure, and a cooling device 60 that cools the recording medium S on which the image has been fixed.

Each of the image forming units 10 includes: a photoconductor drum 11 that is rotatably attached; a charging device 12 provided around the photoconductor drum 11 to charge the photoconductor drum 11; an exposure device 13 that exposes the photoconductor drum 11 to write an electrostatic latent image thereon; a developing device 14 that visualizes the electrostatic latent image on the photoconductor drum 11 with toner; a primary transfer device 15 that transfers the toner image of each color component formed on the photoconductor drum 11 onto the intermediate transfer belt 20; and a drum cleaner 16 that removes residual toner on the photoconductor drum 11. It should be noted that each of the image forming units 10 is referred to as a yellow image forming unit 10Y, a magenta image forming unit 10M, a cyan image forming unit 10C and a black image forming unit 10K in the following description.

The intermediate transfer belt 20 is configured to loop over three roll members 21 to 23 to rotate. Among the roll members, the roll member 22 is configured to drive the intermediate transfer belt 20. The roll member 23 is arranged to face a secondary transfer roll 31 with the intermediate transfer belt 20 interposed therebetween, thus the secondary transfer device 30 is constituted by the secondary transfer roll 31 and the roll member 23. A belt cleaner 24 that removes residual toner on the intermediate transfer belt 20 is provided at a position facing the roll member 21 with the intermediate transfer belt 20 interposed therebetween.

The recording medium supplier 40 includes a recording medium container 41 that contains the recording medium S and a take up roll 42 that takes up and transports the recording medium S contained in the recording medium container 41. A transport path of the recording medium S supplied from the recording medium supplier 40 is provided with plural transport rolls 43. It should be noted that materials constituting the recording medium S, as an example of a sheet, may be configured with various kinds of paper materials as a matter of course. Other than the paper materials, the medium may be formed of resin used for OHP transparencies, for example, or configured with a paper material having a resin film coating on a surface thereof.

The fixing device 50 includes a heat source that heats the recording medium S. In the exemplary embodiment, an image transferred onto the recording medium S is fixed by applying heat and pressure.

The cooling device 60 has a function of cooling the recording medium S heated by the fixing device 50, and may employ a configuration such that, for example, two metal rolls are arranged to catch the recording medium S therebetween, and the recording medium S passes between the rolls while being in contact with the rolls.

Here, the image forming apparatus in the exemplary embodiment is configured to be capable of, in addition to forming an image on one surface of the recording medium S supplied from the recording medium supplier 40, reversing and transporting the recording medium S on one surface of which the image has been formed, thereby forming an image on the other surface of the recording medium S. Accordingly, the image forming apparatus includes a reverse transport mechanism 70 that reverses the sides of the recording medium S having passed through the fixing device 50 and the cooling device 60 and leading and trailing ends in the transport direction thereof and returns the recording medium S to the secondary transfer device 30 again. The reverse transport mechanism 70 is provided downstream of the cooling device 60 in the transport direction of the recording medium S and includes a switching device 71 that switches a proceeding direction of the recording medium S between a transport path for outputting the recording medium S to the outside of the image forming apparatus and a transport path for reverse transporting. The reverse transport mechanism 70 further includes a reversing device 72, provided within the transport path for reverse transporting, which reverses the sides of the recording medium S heading for the secondary transfer device 30 again by reversing the transport direction of the recording medium S. It should be noted that plural rolls 43 are also mounted to the transport path for reverse transporting of the recording medium S.

The image forming apparatus of the exemplary embodiment further includes a length measuring device 100 provided downstream of the cooling device 60 and upstream of the switching device 71 in the transport direction of the recording medium S, which measures the length in the transport direction of the recording medium S transported from the cooling device 60. The position to which the length measuring device 100 is attached is not limited to the above-described location, but the length measuring device 100 may be attached to the transport path for reverse transporting of the recording medium S.

The image forming apparatus further includes a controller 80 that controls operations of the devices and parts constituting the image forming apparatus, and a user interface (UI) 90, as an example of a notification unit, that outputs instructions from a user to the controller 80 and provides instructions received from the controller 80 to a user via a screen or the like not shown in the figure.

Figure 2:
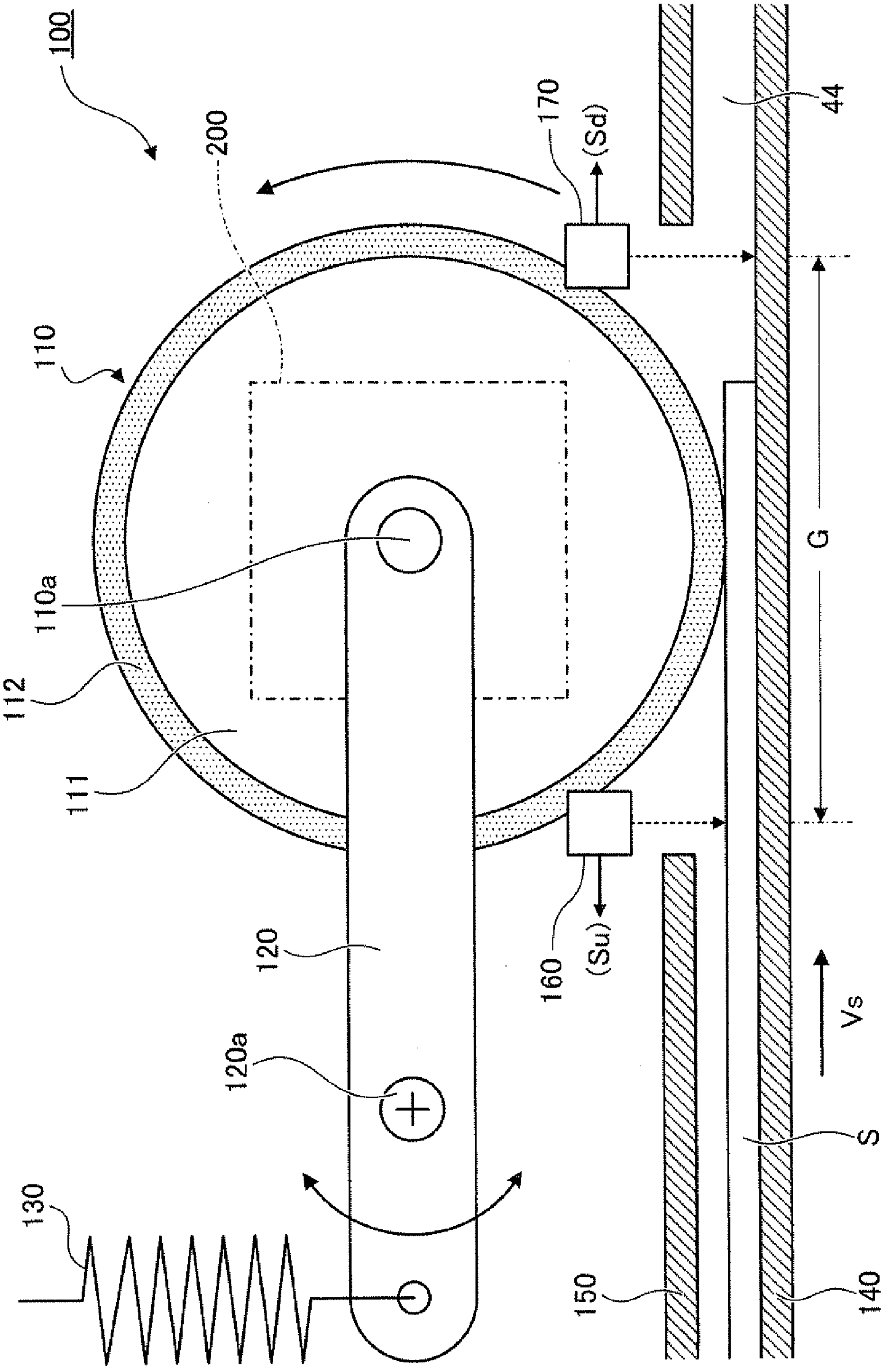
FIG. 2 is a schematic block diagram illustrating an example of a length measuring device used in the exemplary embodiment.

FIG. 2 is a schematic block diagram illustrating an example of the length measuring device 100 provided to the image forming apparatus shown in FIG. 1, which is used for measuring the length of the recording medium S being transported.

The length measuring device 100 includes a length measuring roll 110 that rotates around a rotation axis 110*a* above a transport path 44 and a rotation amount detector 200 that is attached to the rotation axis 110*a* of the length measuring roll 110 and detects the rotation amount of the length measuring roll 110.

The length measuring roll 110 as an example of a rotation body includes a roll main body 111 that has a circular-shaped cross section and is formed of a metal, for example, and a surface layer 112 that is made of an elastic body such as rubber and formed on an outer circumferential surface of the roll main body 111. The rotation axis 110*a* of the length measuring roll 110 is attached to the roll main body 111.

The length measuring device 100 also includes a swing arm 120 that swings around a swing axis 120*a* above the transport path 44, which extends in the same direction as the rotation axis 110*a*. Here, the swing axis 120*a* is arranged upstream of the rotation axis 110*a* of the length measuring roll 110 in the transport direction of the recording medium S. Further, the swing axis 120*a* is attached to a housing (not shown) of the length measuring device 100. The swing arm 120 extends along the transport direction of the recording medium S in the state shown in FIG. 2, and the rotation axis 110*a* of the length measuring roll 110 is attached to an end portion of the swing arm 120 corresponding to a downstream side of the transport direction of the recording medium S. On the other hand, at an end portion of the swing arm 120 corresponding to an upstream side of the transport direction of the recording medium S, one end of a coil spring 130 is attached. The other end of the coil spring 130 is attached to a support portion (not shown) provided on an opposite side of the transport path 44 with the swing arm 120 interposed therebetween.

In the state shown in FIG. 2, the coil spring 130 is in a pulled state, thereby generating a force that rotates the swing arm 120 around the swing axis 120*a* in a clockwise direction in FIG. 2. In this manner, in the length measuring device 100, the coil spring 130 applies a force in the clockwise direction in FIG. 2 to the swing arm 120, thus pressing the length measuring roll 110 against the transport path 44 (and the recording medium S transported within the transport path 44).

In the exemplary embodiment, the length measuring roll 110 rotates to follow the movement of the recording medium S by making the length measuring roll 110 in contact with the recording medium S being transported.

The transport path 44 for transporting the recording medium S is formed by a lower side guide member 140 and an upper side guide member 150 that are arranged to face each other with a space of a predetermined dimension interposed therebetween. Each of the lower side guide member 140 and the upper side guide member 150 has a plate shape and a function of guiding the recording medium S being transported and regulating the moving direction of the recording medium S. In the exemplary embodiment, the recording medium S is transported within the transport path 44 while being in contact with the lower side guide member 140, and regulated by the upper side guide member 150 not to be displaced upwardly. However, the upper side guide member 150 is removed, at the location where the length measuring roll 110 is attached, to expose the transport path 44 and the recording medium S being transported within the transport path 44. Further, the length measuring device 100 includes an upstream side detecting sensor 160 that detects passing of a leading edge and a trailing edge of the recording medium S in the transport direction thereof on the upstream side, in the transport direction of the recording medium S, of a location where the length measuring roll 110 and the recording medium S (or the lower side guide member 140) come into contact with each other, and a downstream side detecting sensor 170 that detects passing of the leading edge and the trailing edge of the recording medium S in the transport direction thereof on the downstream side, in the transport direction of the recording medium S, of a location where the length measuring roll 110 and the recording medium S (or the lower side guide member 140) come into contact with each other. In the exemplary embodiment, each of the upstream side detecting sensor 160 and the downstream side detecting sensor 170 is an optoelectronic detector constituted by an LED (Light Emitting Diode) and a photosensor and optically detects the recording medium S which is transported passing through the detecting position. Accordingly, each of the upstream side detecting sensor 160 and the downstream side detecting sensor 170 is mounted, at a location where the upper side guide member 150 is not provided, to face the lower side guide member 140. The upstream side detecting sensor 160 and the downstream side detecting sensor 170 output an upstream side edge signal Su and a downstream side edge signal Sd, respectively. Hereinafter, the distance between the detecting position of the recording medium S by the upstream side detecting sensor 160 and the detecting position of the recording medium S by the downstream side detecting sensor 170 is referred to as a gap G. Further, in the image forming apparatus shown in FIG. 1, the recording medium S is transported within the transport path 44 at a predetermined speed, and the set speed of the recording medium S is referred to as a recording medium transport speed Vs.

It should be noted that the lower side guide member 140 which is secured is arranged to face the length measuring roll 110 in the exemplary embodiment, however, a roll member rotatably provided may be arranged to face the length measuring roll 110.

Figure 3:
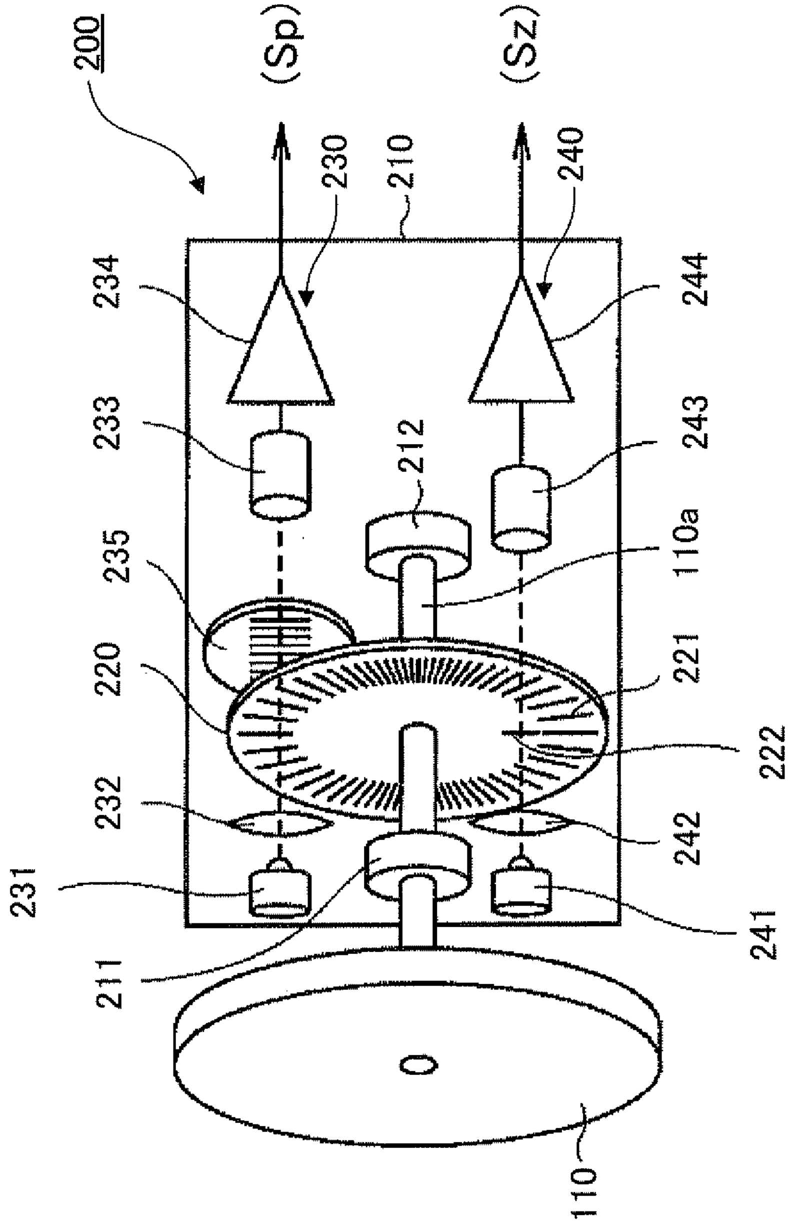
FIG. 3 is a schematic block diagram illustrating an example of a rotation amount detector used in the exemplary embodiment.

FIG. 3 is a schematic block diagram illustrating an example of the rotation amount detector 200 provided to the length measuring device 100 shown in FIG. 2, which detects an amount of rotation of the length measuring roll 110 via the rotation axis 110*a*. The rotation amount detector 200 is provided to share the rotation axis 110*a* with the length measuring roll 110 on one end side thereof, and configured to swing together with the length measuring roll 110 when the swing arm 120 shown in FIG. 2 swings.

The rotation amount detector 200 as an example of an output unit has a rectangular shape, for example, and includes therein: a housing 210 into which the rotation axis 110*a* of the length measuring roll 110 is inserted; two bearings 211 and 212 that are secured to the housing 210 inside thereof to rotatably support the rotation axis 110*a*; and a slit circular plate 220 that is a circular plate attached to the rotation axis 110*a* while being secured thereto inside the housing 210, in which plural slits are radially formed as described later.

The slit circular plate 220 is formed of glass, for example. The slit circular plate 220 is provided with plural first slits 221 and a second slit 222 so as to penetrate both sides of the slit circular plate 220, The first slits 221 are formed in the circumferential direction at regular intervals and a second slit 222 is formed inside of the first slits 221 in the radial direction, where only one second slit 222 is formed in the circumferential direction.

The rotation amount detector 200 further includes a first slit detector 230 that detects passing of each of the first slits 221 when the slit circular plate 220 rotates along with the rotation of the length measuring roll 110 and the rotation axis 110*a*, and a second slit detector 240 that detects passing of the second slit 222. The first slit detector 230 and the second slit detector 240 are contained in the housing 210.

Among these slit detectors, the first slit detector 230 includes: a first light-emitting element 231 that emits light toward a limb portion of the slit circular plate 220, namely, the location where the plural first slits 221 are formed; a first lens 232 that gathers light emitted from the first light-emitting element 231 toward the slit circular plate 220; secure slits 235 arranged on an optical axis of light that has been emitted from the first light-emitting element 231 and passed through the first slits 221 provided on the slit circular plate 220; a first light-receiving element 233 that receives light passed through the first slits 221 provided on the slit circular plate 220 and the secure slits 235; and a first amplifier 234 that amplifies an output signal from the first light-receiving element 233.

On the other hand, the second slit detector 240 includes: a second light-emitting element 241 that emits light toward the location, which is provided inside of the limb portion of the slit circular plate 220, where the single second slit 222 is formed; a second lens 242 that gathers light emitted from the second light-emitting element 241 toward the slit circular plate 220; a second light-receiving element 243 that receives light emitted from the second light-emitting element 241 and passed through the second slit 222 provided on the slit circular plate 220; and a second amplifier 244 that amplifies an output signal from the second light-receiving element 243.

Among these components, each of the first light-emitting element 231 and the second light-emitting element 241 is configured with a light emitting diode (LED), for example, and each of the first light-receiving element 233 and the second light-receiving element 243 is configured with a photodiode (PD), for example.

In the rotation amount detector 200, the first light-receiving element 233 intermittently receives light that has been emitted from the first light-emitting element 231, finely split on a time base by the first slits 221 provided on the slit circular plate 220 in accordance with the rotation of the slit circular plate 220 along with the rotation of the length measuring roll 110, and passed through the first slits 221 and the secure slits 235. The first light-receiving element 233 then outputs a pulse waveform corresponding to timing of the received light as the output signal. The first amplifier 234 outputs a phase signal Sp obtained by amplifying the output signal to the controller 80 (refer to FIG. 1) provided in the image forming apparatus.

On the other hand, in the rotation amount detector 200, the second light-receiving element 243 receives light that has passed through the second slit 222 only once per every single rotation of the length measuring roll 110, and outputs a pulse waveform corresponding to timing of the received light as the output signal. The second amplifier 244 outputs a Z-phase signal Sz obtained by amplifying the output signal to the controller 80 (refer to FIG. 1) provided in the image forming apparatus.

It should be noted that a rotary encoder of a so-called "incremental-type" is used as the rotation amount detector 200 in the exemplary embodiment, however, as long as the amount of rotation of the length measuring roll 110 may be measured with a unit of less than one circle $\{2\pi(\text{rad})\}$, the rotary encoder may appropriately be changed to any type. As such a device, a rotary encoder of, for example, an absolute type may be provided. Further, in the exemplary embodiment, the rotation amount detector 200 is configured to employ a light amount variation, but the rotation amount detector is not limited thereto, and a magnetic variation, for example, may be employed.

Figure 4:
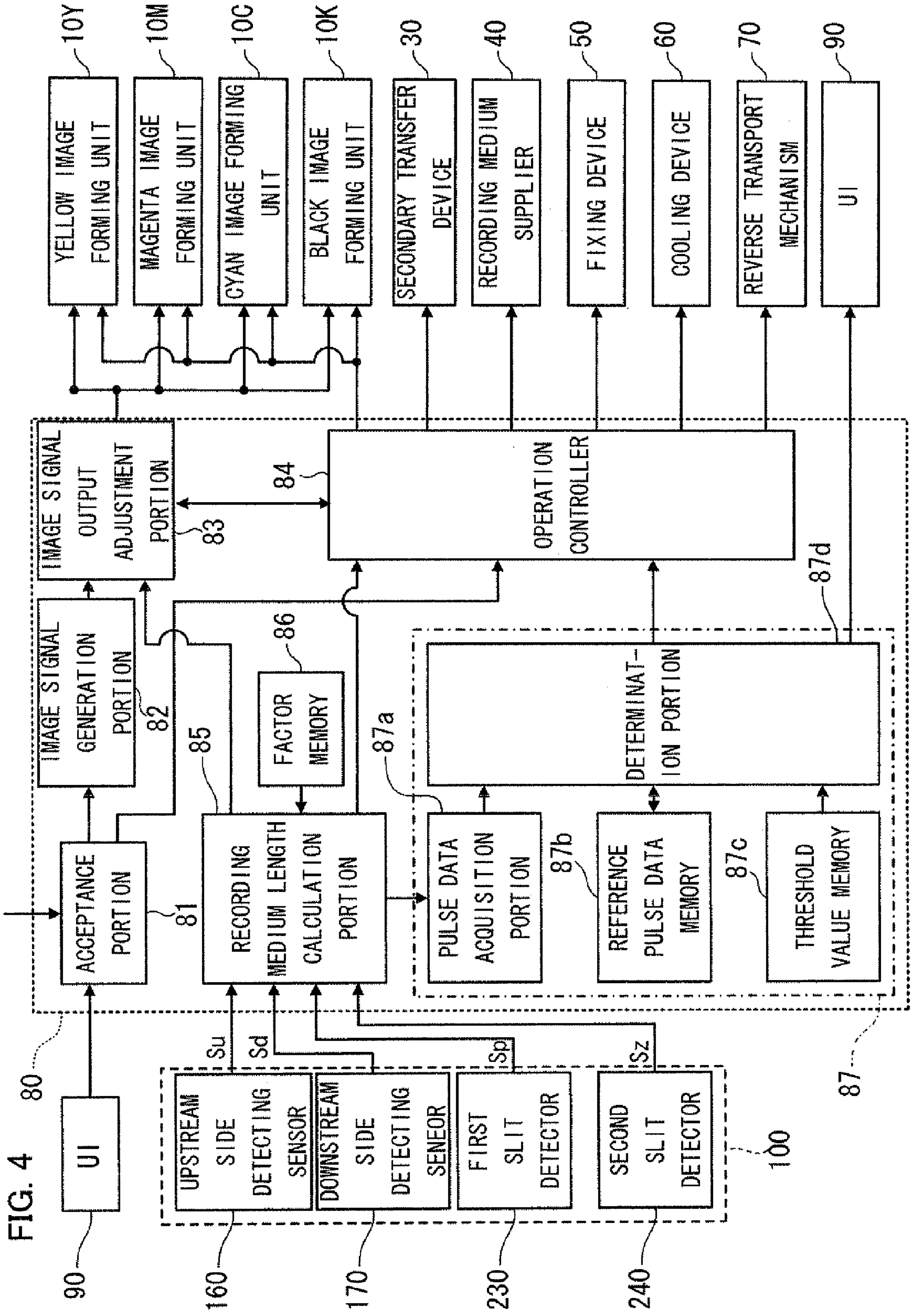
FIG. 4 is a block diagram illustrating an example of configuration of a controller of the image forming apparatus.

FIG. 4 is a block diagram illustrating an example of configuration of the controller 80 shown in FIG. 1.

The controller 80 includes: an acceptance portion 81 that accepts instructions outputted from the UI portion 90 or an external appliances (not shown) connected to the image forming apparatus; and an image signal generation portion 82 that generates an image signal for each of yellow, magenta, cyan and black colors based on image data transmitted with print instructions when the print instructions are accepted via the acceptance portion 81. The controller 80 further includes an image signal output adjustment portion 83 that adjusts timing for outputting the image signal for each color generated by the image signal generation portion 82 to each of the image forming units 10 (more specifically, the exposure device 13 provided to each image forming unit 10), and also adjusts magnification of the image signal for each color generated by the image signal generation portion 82 in a slow scanning direction (a direction corresponding to the transport direction of the recording medium S). Moreover, the controller 80 includes an operation controller 84 that controls operations of each parts constituting the image forming apparatus, such as each image forming unit 10 (10Y, 10M, 10C and 10K), the secondary transfer device 30, the recording medium supplier 40, the fixing device 50, the cooling device 60 and the reverse transport mechanism 70. It should be noted that the operation controller 84 functions as a suspending unit in the exemplary embodiment.

Further, the controller 80 of the exemplary embodiment includes a recording medium length calculation portion 85 that calculates a recording medium length L, which is a length in the transport direction of the recording medium S (a length of a sheet in the transport direction) passing through the length measuring device 100, based on various signals inputted from the length measuring device 100. Here, the various signals inputted to the recording medium length calculation portion 85 as an example of a calculation unit includes: the upstream side edge signal Su inputted from the upstream side detecting sensor 160; the downstream side edge signal Sd inputted from the downstream side detecting sensor 170; the phase signal Sp inputted from the first slit detector 230; and the Z-phase signal Sz inputted from the second slit detector 240. The controller 80 also includes a factor memory 86 that stores various factors used for calculating the recording medium length L in the recording medium length calculation portion 85. The factor memory 86 stores: the gap G (refer to FIG. 2) in the length measuring device 100; the recording medium transport speed Vs (refer to FIG. 2) determined in advance in accordance with, for example, every type of the recording medium S; and a unit moving length X that is an amount of movement of the circumferential surface of the length measuring roll 110 per a single pulse count of the phase signal Sp. The recording medium length L calculated in the recording medium length calculation portion 85 is outputted to the image signal output adjustment portion 83 to be used for output adjustment of an image signal, and outputted to the operation controller 84 to be used for controlling the operations of each part constituting the image forming apparatus.

Further, the controller 80 in the exemplary embodiment includes an abnormality detector 87 that detects abnormality occurred in the length measuring device 100 (more specifically, in the length measuring roll 110 and the rotation amount detector 200) based on the various signals inputted from the length measuring device 100 via the recording medium length calculation portion 85. The abnormality detector 87 is configured to receive input of the upstream side edge signal Su, the downstream side edge signal Sd, the phase signal Sp and the Z-phase signal Sz, as described above.

The abnormality detector 87 includes a pulse data acquisition portion 87*a*, as an example of an acquisition unit, that acquires pulse data, as an example of periodic information, obtained from the phase signal Sp corresponding to one rotation (one cycle) of the length measuring roll 110, based on the upstream side edge signal Su, the downstream side edge signal Sd, the phase signal Sp and the Z-phase signal Sz being inputted. The abnormality detector 87 also includes a reference pulse data memory 87*b*, as an example of a memory, that stores reference pulse data, as an example of reference periodic information, acquired by the pulse data acquisition portion 87*a* at predetermined timing. The abnormality detector 87 further includes a threshold value memory 87*c* that stores various threshold values to be referred for detecting abnormality in the length measuring roll 110 and the rotation amount detector 200. Here, the threshold value memory 87*c* stores an eccentricity threshold value a used for determination of an abnormality in eccentricity of the length measuring roll 110 and an outer circumferential surface threshold value β used for determination of an abnormality in the circumferential surface of the length measuring roll 110. Moreover, the abnormality detector 87 includes a determination portion 87*d*, as an example of an abnormality detector or a determination unit, that determines whether or not an abnormality occurs in the length measuring device 100 based on recorded pulse data acquired by the pulse data acquisition portion 87*a* at timing different from that of the reference pulse data, and using the reference pulse data read from the reference pulse data memory 87*b* and the various threshold values read from the threshold value memory 87*c*. The determination portion 87*d* is configured to output a control signal based on a determination result to the operation controller 84 and the UI 90. Details of the reference pulse data and the recorded pulse data acquired by the pulse data acquisition portion 87*a* and details of the eccentricity threshold value a and the outer circumferential surface threshold value β stored in the threshold value memory 87*c* will be described later.

The controller 80 includes a CPU (Central Processing Unit), a ROM (Read Only Memory), a RAM (Random Access Memory) and the like, and the CPU is configured to execute processing while exchanging data with the RAM in accordance with a program stored in the ROM in advance.

Figure 5:
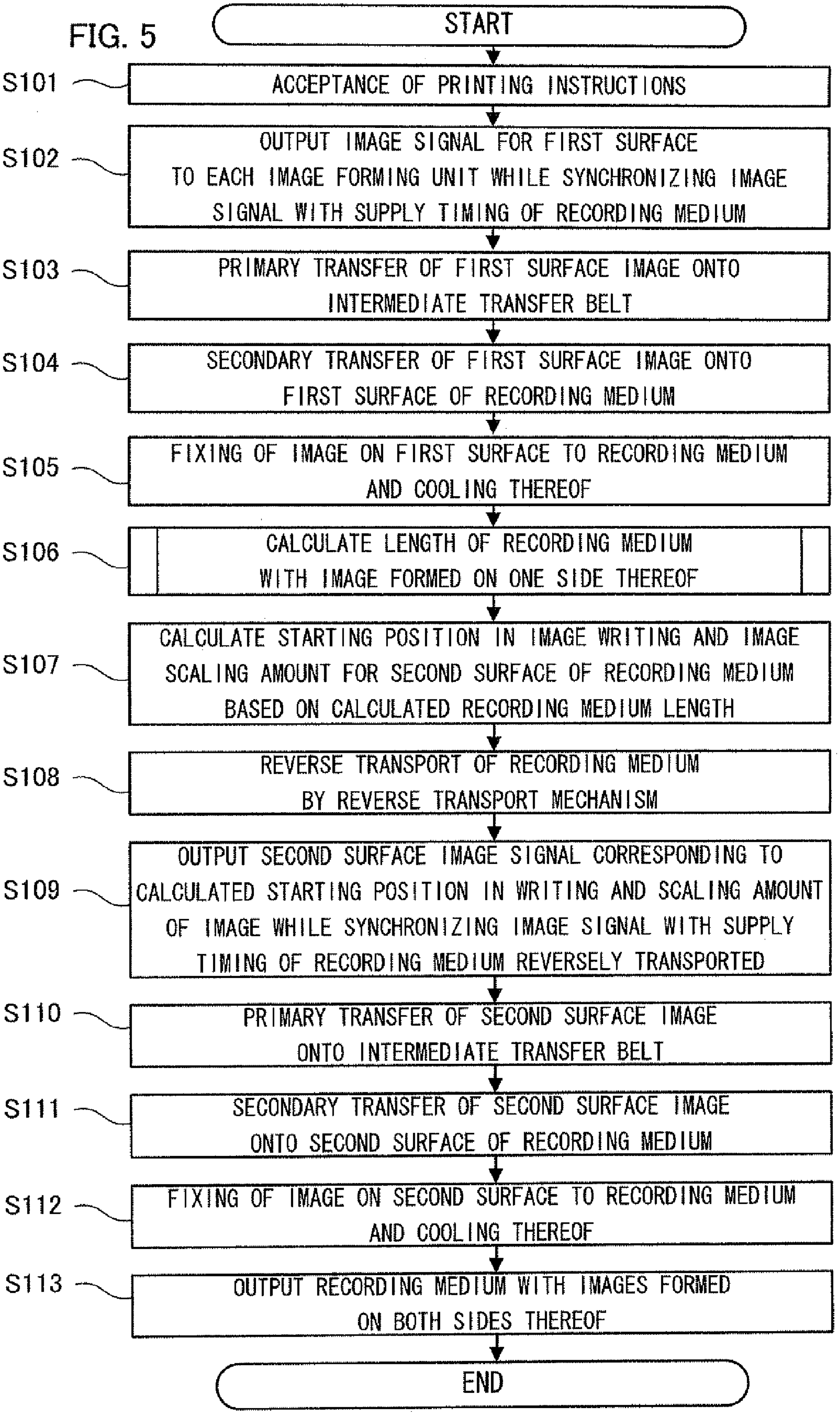
FIG. 5 is a flowchart illustrating an example of processing of the controller in a case where image formation is carried out on both sides of a recording medium by using the image forming apparatus.

FIG. 5 is a flowchart illustrating an example of processing of the controller 80 in the case where image formation is carried out on both sides of the recording medium S by using the image forming apparatus shown in FIG. 1. Hereinafter, description will be provided with reference to FIG. 5 and FIGS. 1 to 4.

When the acceptance portion 81 accepts instructions for printing request from the UI 90 or the external appliances (step 101), the operation controller 84 activates each part constituting the image forming apparatus to carry out a warm-up operation, and the image signal generation portion 82 generates an image signal of each color for the first surface corresponding to an image to be formed on the first surface of the recording medium S based on the image data being inputted. Then the operation controller 84 causes the recording medium supplier 40 to start supplying the recording medium S, and the image signal output adjustment portion 83 outputs the image signal of each color for the first surface generated by the image signal generation portion 82 to each image forming unit 10 (more specifically, the exposure device 13 provided in each of the image forming units 10) while synchronizing the image signal for the first surface and the supply timing of the recording medium S (step 102).

With these operations, in each image forming unit 10, an image (in this example, a toner image) corresponding to the image signal of each color for the first surface is formed. Specifically, the operation controller 84 causes the photoconductor drum 11 of each image forming unit 10 to rotate, charges the rotating photoconductor drum 11 by the charging device 12, and thereafter, exposes the photoconductor drum 11 with a beam corresponding to the image signal of each color for the first surface from the exposure device 13, thus forming an electrostatic latent image on the surface of the photoconductor drum 11. Next, the operation controller 84 causes the electrostatic latent image formed on each photoconductor drum 11 to be developed by the developing device 14 of the corresponding color, thus forming the image of each color for the first surface. Thereafter, the operation controller 84 causes the images for the first surface formed on the respective photoconductor drums 11 to be primarily transferred in sequence onto the intermediate transfer belt 20 which is rotated and driven together with the photoconductor drums 11, by using the respective primary transfer devices 15 (step 103). The images for the first surface having been superimposed on the intermediate transfer belt 20 by the primary transfer are transported toward a secondary transfer position, which is a facing position between the secondary transfer roll 31 and the roll member 23 in the secondary transfer device 30, along with further rotation of the intermediate transfer belt 20.

On the other hand, the recording medium S supplied from the recording medium supplier 40 is transported by the transport rolls 43 and arrives at the secondary transfer position. The operation controller 84 causes the images for the first surface formed on the intermediate transfer belt 20 to be secondarily transferred onto the first surface of the recording medium S by using the secondary transfer device 30 (step 104).

Next, the operation controller 84 applies, for example, heat and pressure to the recording medium S on the first surface of which the image is transferred by using the fixing device 50 to fix the image on the first surface to the recording medium S. Further, the operation controller 84 causes the recording medium S having been heated by the fixing device 50 to be cooled by the cooling device 60 (step 105).

The recording medium S with an image recorded on one side thereof, on the first surface of which the image has been fixed, is transported from the cooling device 60 to the length measuring device 100. In the length measuring device 100, the length measuring roll 110 is rotated along with the transportation of the recording medium S with the image recorded on one side thereof, and thereby the phase signal Sp corresponding to an amount of rotation of the length measuring roll 110 is outputted from the first slit detector 230, and the Z-phase signal Sz corresponding to the amount of rotation of the length measuring roll 110 is outputted from the second slit detector 240. Further, along with the transportation of the recording medium S with the image recorded on one side thereof, the upstream side edge signal Su is outputted from the upstream side detecting sensor 160 and the downstream side edge signal Sd is outputted from the downstream side detecting sensor 170. These various signals outputted from the length measuring device 100 are inputted to the recording medium length calculation portion 85. The recording medium length calculation portion 85 calculates the length L of the recording medium S with the image recorded on one side thereof having passed the length measuring device 100 by using the various signals inputted from the length measuring device 100 and various factors read from the factor memory 86 (step 106). Thereafter, the recording medium length calculation portion 85 outputs the calculated length L of the recording medium S to the image signal output adjustment portion 83 and the operation controller 84. The calculation method of the recording medium length L will be described in detail later.

Next, based on the recording medium length L having been received, the image signal output adjustment portion 83 calculates timing for outputting an image signal of each color for the second surface to be generated by the image signal generation portion 82 to the exposure device 13 provided to each of the image forming units 10 (namely, a starting position of writing on the photoconductor drum 11 by the exposure device 13) and a magnification (scaling amount) in the slow scanning direction of the image signal of each color for the second surface to be generated by the image signal generation portion 82 (step 107).

Meanwhile, the operation controller 84 switches the switching device 71 to the transport path for the reverse transporting before the leading edge of the recording medium S in the transport direction thereof with the image recorded on one side thereof arrives, and causes the recording medium S entering the reversing device 72 to exit while reversing the sides thereof by reversing the moving direction thereof. As a result, the recording medium S with the image recorded on one side thereof is reversely transported toward the transport path provided upstream of the secondary transfer device 30 in the transport direction by the reverse transport mechanism 70 (step 108).

The image signal generation portion 82 then generates the image signal of each color for the second surface corresponding to an image to be formed on the second surface of the recording medium S based on the image data being inputted. The operation controller 84 further transports the recording medium S with the image recorded on one side thereof being reversely transported, and the image signal output adjustment portion 83 adjusts the image signal of each color for the second surface generated by the image signal generation portion 82 in accordance with the starting position of writing and the scaling amount calculated in step 107, and then outputs the adjusted image signal to each of the image forming units 10 (more specifically, the exposure device 13 provided to each of the image forming units 10) while synchronizing the image signal to the supply timing of the recording medium S with the image recorded on one side thereof being reversely transported (step 109).

With the above operations, formation of an image corresponding to the image signal of each color for the second surface is performed in each image forming unit 10. Specifically, the operation controller 84 causes the photoconductor drum 11 in each image forming unit 10 to rotate and causes the rotated photoconductor drum 11 to be charged by the charging device 12, and thereafter causes the photoconductor drum 11 to be exposed with a beam corresponding to the image signal of each color for the second surface from the exposure device 13, thus forming an electrostatic latent image on the surface of the photoconductor drum 11. Next, the operation controller 84 causes the electrostatic latent image formed on each photoconductor drum 11 to be developed by the developing device 14 of each corresponding color, thus forming the image of each color for the second surface. Thereafter, the operation controller 84 causes the images for the second surface formed on the respective photoconductor drums 11 to be primarily transferred in sequence onto the intermediate transfer belt 20 which is rotated and driven together with the photoconductor drums 11, by using the respective primary transfer devices 15 (step 110). The images for the second surface having been superimposed on the intermediate transfer belt 20 by the primary transfer are transported toward the secondary transfer position, along with further rotation of the intermediate transfer belt 20.

On the other hand, the recording medium S with the image recorded on one side thereof being reversely transported is further transported by the transport rolls 43 and arrives at the secondary transfer position again. The operation controller 84 causes the images for the second surface formed on the intermediate transfer belt 20 to be secondarily transferred onto the second surface of the recording medium S, by using the secondary transfer device 30 (step 111).

Next, the operation controller 84 applies, for example, heat and pressure to the recording medium S on the second surface of which the image is transferred by using the fixing device 50 to fix the image on the second surface to the recording medium S. Further, the operation controller 84 causes the recording medium S having been heated by the fixing device 50 to be cooled by the cooling device 60 (step 112).

The operation controller 84 switches the switching device 71 to the transport path for outputting the recording medium S to the outside of the image forming apparatus before the leading edge of the recording medium S with the images recorded on both sides thereof arrives, the images being fixed on the first and second surfaces thereof, and causes the recording medium S with the images recorded on both sides thereof to exit to the outside of the image forming apparatus as being transported (step 113), thus completing a series of operations.

After the above-described double-sided image formation is carried out for plural recording media S, the plural recording media S, each of which has images formed on both sides, are bound to make one booklet. At this occasion, if there occur variations in the recording medium length L among the plural recording media S, since conditions for image formation such as the starting position of writing and the magnification in the slow scanning direction are adjusted based on the recording medium length L measured by the length measuring device 100, an amount of displacement in a recording position between the plural recording media S in a horizontal two-page spread or a vertical two-page spread is reduced, and thereby a booklet of high quality is made compared to a case where the adjustment to outputting of the image signal based on the recording medium length L is not performed.

It should be noted that, here, the displacement between the images formed on the first and second surfaces of the recording medium S is suppressed by performing the adjustment to outputting of the image signal for the second surface to be provided to the exposure device 13 by the image signal output adjustment portion 83. However, the way to suppress the image displacement is not limited thereto. For example, the magnification of an image in the slow scanning direction may be adjusted by controlling the rotation speed of each of the photoconductor drums 11 relative to the moving speed of the intermediate transfer belt 20.

The calculation method of the recording medium length L of the recording medium S in the above-mentioned step 106 will be described.

Figure 6A:
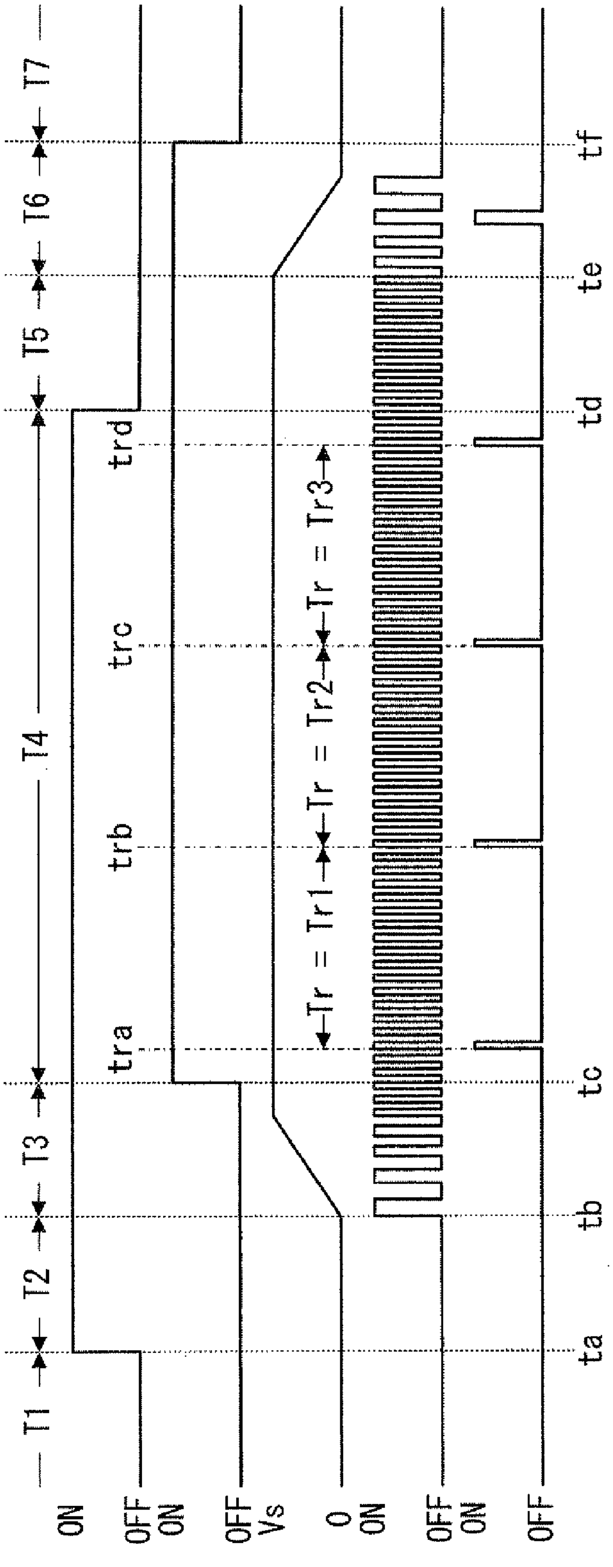
FIGS. 6A to 6C are timing charts illustrating an example of a relationship between a roll speed of a length measuring roll that rotates along with passing of the recording medium and various signals outputted by the length measuring device.
Figure 6B:
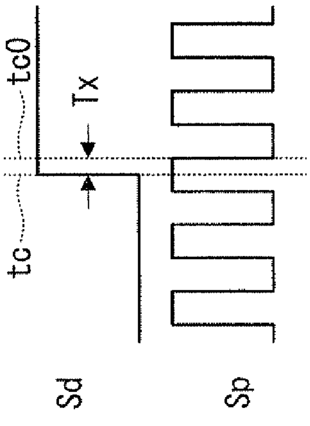
Figure 6C:
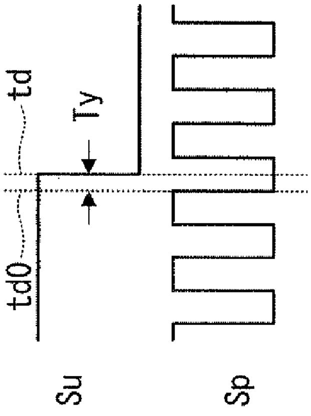

FIG. 6A is a timing chart illustrating an example of a relationship among: the roll speed Vr of the length measuring roll 110 that rotates along with passing of the recording medium S; the upstream side edge signal Su outputted from the upstream side detecting sensor 160; the downstream side edge signal Sd outputted from the downstream side detecting sensor 170; the phase signal Sp outputted from the first slit detector 230; and the Z-phase signal Sz outputted from the second slit detector 240. FIG. 6B illustrates the relationship between the downstream side edge signal Sd and the phase signal Sp, while being enlarged, around a third time point tc that will be described later, and FIG. 6C illustrates the relationship between the upstream side edge signal Su and the phase signal Sp, while being enlarged, around a fourth time point td that will be described later. It should be noted that the roll speed Vr means the moving speed of the circumferential surface of the length measuring roll 110.

During a first time period T1, in which the recording medium S has not entered the length measuring device 100, since the recording medium S does not exist, each of the upstream side edge signal Su and the downstream side edge signal Sd is in the off state. Further, during the first time period T1, the roll speed Vr is 0 because the length measuring roll 110 is at rest, and thereby the phase signal Sp and the Z-phase signal Sz maintain the off state. However, even when the length measuring roll 110 is at rest, the phase signal Sp or the Z-phase signal Sz maintains the on state in some cases depending on positions of the first slits 221 or the second slit 222 provided on the slit circular plate 220.

Next, at a first time point ta when the leading edge in the transport direction (hereinafter, simply referred to as "leading edge") of the recording medium S being transported arrives at a detecting position of the upstream side detecting sensor 160, the upstream side edge signal Su turns from the off state to the on state. At this time, the downstream side edge signal Sd maintains the off state and the length measuring roll 110 is still at rest (Vr=0), and accordingly, the phase signal Sp and the Z-phase signal Sz still maintain the off state.

At a second time point tb, which is a time point after a second time period T2 has elapsed from the first time point ta, when the leading edge of the recording medium S being transported arrives at a location facing the length measuring roll 110, the length measuring roll 110 starts to be rotated and driven by the recording medium S. However, the roll speed Vr of the length measuring roll 110 does not reach the recording medium transport speed Vs immediately, but gradually increases toward the recording medium transport speed Vs. Further, because the slit circular plate 220 starts to be rotated as the length measuring roll 110 starts rotating, the phase signal Sp comes to alternately repeat the on state and the off state. It should be noted that, since the roll speed Vs is gradually increased as described above, the interval between the on state and the off state in the phase signal Sp is gradually reduced.

At the third time point tc, which is a time point after a third time period T3 has elapsed from the second time point tb, when the leading edge of the recording medium S being transported arrives at the detecting position of the downstream side detecting sensor 170, the downstream side edge signal Sd turns from the off state to the on state. At this time, the upstream side edge signal Su maintains the on state and the roll speed Vr of the length measuring roll 110 has been increased up to the recording medium transport speed Vs by the third time point tc. Accordingly, at least after the third time point tc, the phase signal Sp periodically repeats the on state and the off state.

Further, after the slit circular plate 220 starts to rotate, the Z-phase signal Sz temporarily turns from the off state to the on state every one rotation of the slit circular plate 220. It should be noted that FIG. 6A illustrates the example in which the Z-phase signal Sz does not turns to the on state during the second time period T2, but turns to the on state for the first time after the third time point tc.

At the fourth time point td, which is a time point after a fourth time period T4 has elapsed from the third time point tc, when the trailing edge in the transport direction (hereinafter, simply referred to as "trailing edge") of the recording medium S being transported arrives at the detecting position of the upstream side detecting sensor 160, the upstream side edge signal Su turns from the on state to the off state. At this time, the downstream side edge signal Sd maintains the on state and the roll speed Vr of the length measuring roll 110 continues to maintain the recording medium transport speed Vs.

At a fifth time point te, which is a time point after a fifth time period T5 has elapsed from the fourth time point td, the trailing edge of the recording medium S being transported passes through the location facing the length measuring roll 110, and thereby the length measuring roll 110 comes to receive no driving force from the recording medium S. However, the roll speed Vr of the length measuring roll 110 does not immediately become 0 (stop), but is gradually reduced from the recording medium transport speed Vs. Further, as the driving of the length measuring roll 110 is stopped, the rotation speed of the slit circular plate 220 also starts to be reduced, thus gradually increasing the interval between the on state and the off state in the phase signal Sp.

At a sixth time point tf, which is a time point after a sixth time period T6 has elapsed from the fifth time point te, when the trailing edge of the recording medium S being transported arrives at the detecting position of the downstream side detecting sensor 170, the downstream side edge signal Sd turns from the on state to the off state. At this time, the upstream side edge signal Su maintains the off state, and the roll speed Vr of the length measuring roll 110 becomes 0 by the sixth time point tf, thus the length measuring roll 110 stops.

During a seventh time period T7 after the recording medium S exits from the length measuring roll 110, each of the upstream side edge signal Su and the downstream side edge signal Sd are in the off state because there is no recording medium S. Further, in the seventh time period T7, the roll speed Vr is 0 since the length measuring roll 110 stops the rotation thereof, and accordingly, the phase signal Sp and the Z-phase signal Sz also maintain the off state. However, as described above, the phase signal Sp or the Z-phase signal Sz maintains the on state in some cases even though the length measuring roll 110 is at rest.

Here, the third time point tc when the downstream side edge signal Sd turns from the off state to the on state does not necessarily coincide with timing of transition of the phase signal Sp from the off state to the on state (hereinafter, referred to as rising) or timing of transition from the on state to the off state (hereinafter, referred to as falling). Therefore, in the following description, a time period from the third time point tc to a downstream side lag time point tc0 when the phase signal Sp rises or falls for the first time after the third time point tc is referred to as a downstream side lag time period Tx as shown in FIG. 6B. It should be noted that FIG. 6B illustrates a case where the phase signal Sp falls at the downstream side lag time point tc0.

Further, the fourth time point td when the upstream side edge signal Su turns from the off state to the on state does not necessarily coincide with timing of rising or falling of the phase signal Sp. Therefore, in the following description, a time period from an upstream side lag time point td0 when the phase signal Sp rises or falls for the last time before the fourth time point td to the fourth time point td is referred to as an upstream side lag time period Ty as shown in FIG. 6C. It should be noted that FIG. 6C illustrates a case where the phase signal Sp falls at the upstream side lag time point td0.

Hereinafter, in the fourth time period T4 in which a single recording medium S being transported is detected by both upstream side detecting sensor 160 and downstream side detecting sensor 170, a period from turning of the Z-phase signal Sz to the on state and the next turning thereof to the on state again is referred to as a rotation period Tr. The rotation period Tr means a period of a single rotation of the slit circular plate 220 caused by a single rotation of the length measuring roll 110 whose roll speed Vr is set to the recording medium transport speed Vs.

Figure 7:
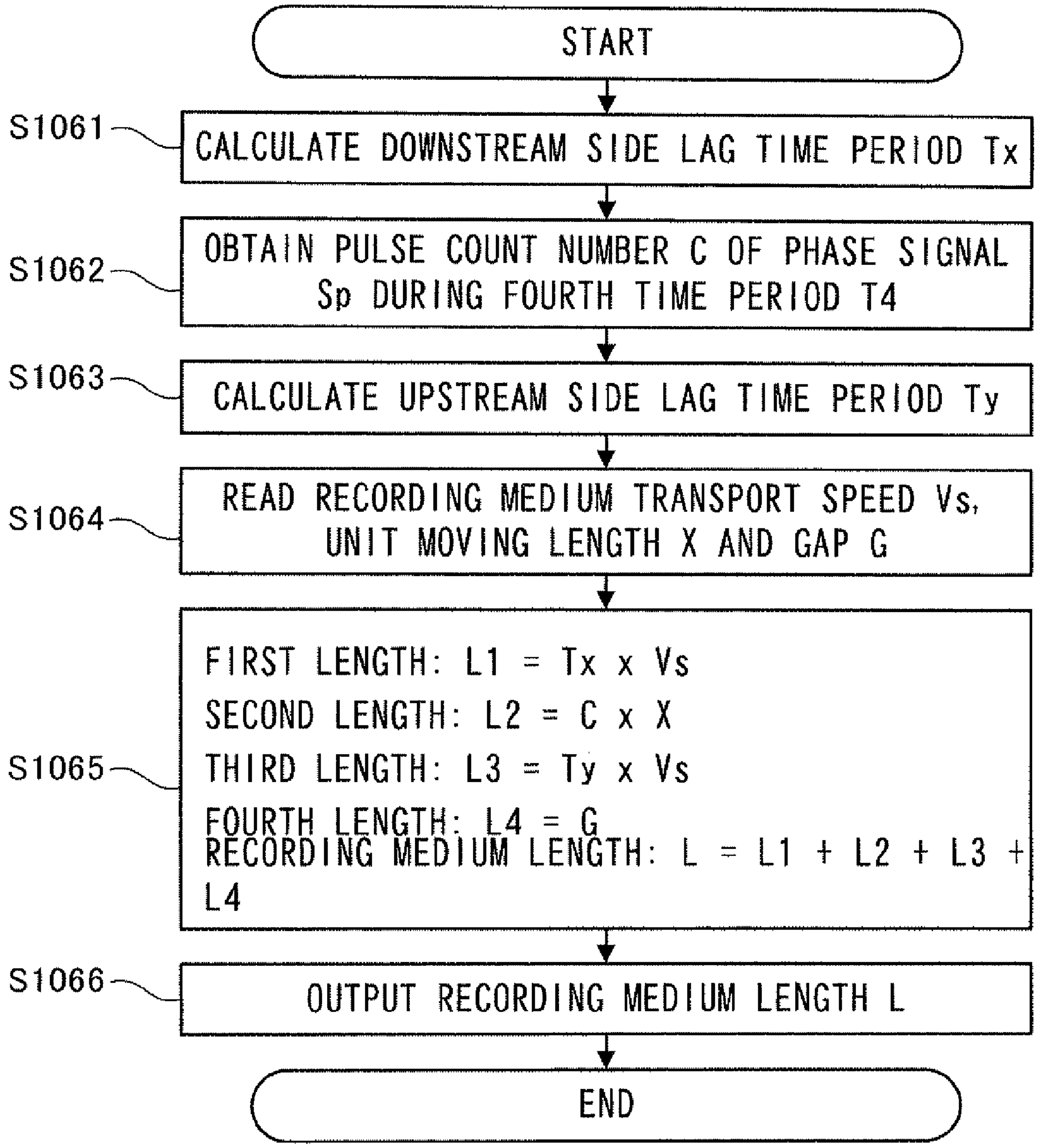
FIG. 7 is a flowchart illustrating an example of processing for calculating a length of the recording medium.
Figure 8:
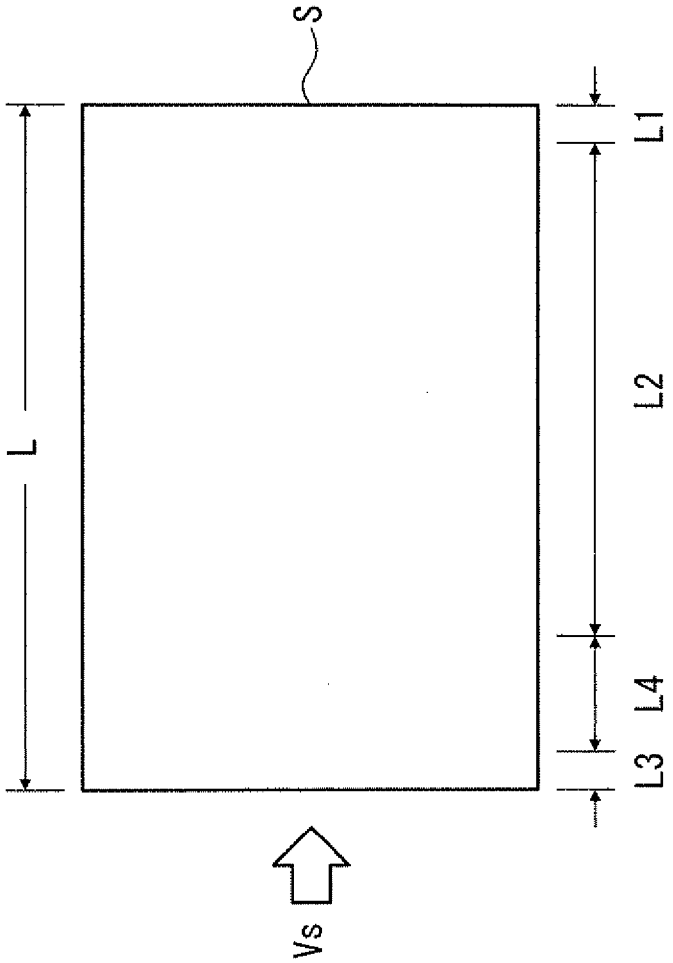
FIG. 8 illustrates the length of the recording medium being transported and a relationship among a first length, a second length, a third length and a fourth length in the length of the recording medium.

FIG. 7 is a flowchart illustrating an example of processing for calculating the recording medium length L in the recording medium length calculation portion 85 shown in FIG. 4. FIG. 8 illustrates a relationship among a first length L1, a second length L2, a third length L3 and a fourth length L4 in the recording medium length L. Details of the first length L1 to the fourth length L4 will be described later.

The recording medium length calculation portion 85 first obtains the third time point tc and the downstream side lag time point tc0 from the downstream side edge signal Sd and the phase signal Sp, and calculates the downstream side lag time period Tx from the third time point tc and the downstream side lag time point tc0 (step 1061).

Next, the recording medium length calculation portion 85 obtains the third time point tc and the fourth time point td from the upstream side edge signal Su and the downstream side edge signal Sd, and further obtains the fourth time period T4 from the third time point tc and the fourth time point td, and then obtains, with reference to the phase signal Sp, a pulse count number C that is the number of times the phase signal Sp rises during the time period T4 (step 1062).

Subsequently, the recording medium length calculation portion 85 obtains the fourth time point td and the upstream side lag time point td0 from the upstream side edge signal Su and the phase signal Sp, and calculates the upstream side lag time period Ty from the fourth time point td and the upstream side lag time point td0 (step 1063).

Then the recording medium length calculation portion 85 reads the recording medium transport speed Vs, the unit moving length X and the gap G from the factor memory 86 (step 1064). At this occasion, the recording medium length calculation portion 85 reads the recording medium transport speed Vs corresponding to the type of the recording medium S to be measured.

Thereafter, the recording medium length calculation portion 85 calculates each of the first length L1, the second length L2, the third length L3 and the fourth length L4, and then calculates the recording medium length L by adding the obtained first length L1 to fourth length L4 (step 1065). Here, the first length L1 is obtained by multiplying the downstream side lag time period Tx calculated in step 1061 by the recording medium transport speed Vs read in step 1064. The second length L2 is obtained by multiplying the pulse count number C obtained in step 1062 by the unit moving length X read in step 1064. Further, the third length L3 is obtained by multiplying the upstream side lag time period Ty obtained in step 1063 by the recording medium transport speed Vs read in step 1064. Still further, the fourth length L4 is the gap G read in step 1064.

The recording medium length calculation portion 85 then outputs the recording medium length L calculated in step 1065 to the image signal output adjustment portion 83 and the operation controller 84 (step 1066), thus completing the series of processes.

In the above-described calculation of the recording medium length L, since the second length L2 constitutes most of the recording medium length L, the pulse count number C in the fourth time period T4 may be obtained as accurately as possible. Consequently, as the length measuring roll 110, a roll with the rotation axis 110*a* having less eccentricity may be used.

However, it is difficult to manufacture the length measuring roll 110 of no eccentricity; therefore, in actuality, the length measuring roll 110 with eccentricity falling within a range of predetermined tolerance is used.

Figure 9A:
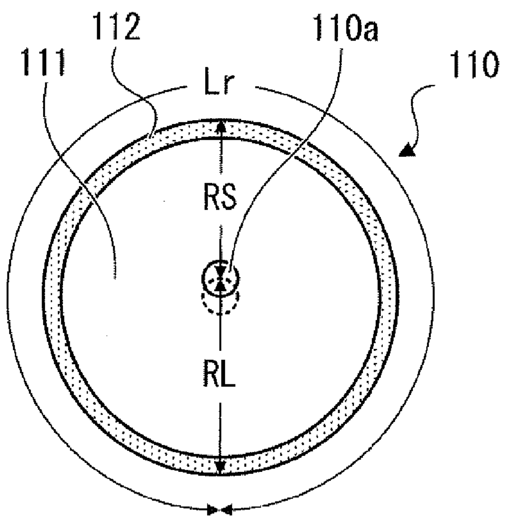
FIG. 9A illustrates an example of a configuration of the length measuring roll having an eccentricity.
Figure 9B:
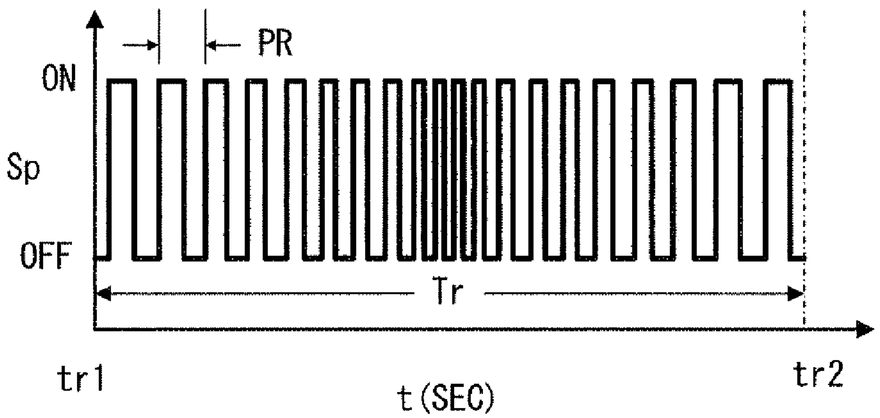
FIG. 9B illustrates an example of a phase signal obtained by a single rotation of the length measuring roll shown in FIG. 9A at a rotation period.
Figure 9C:
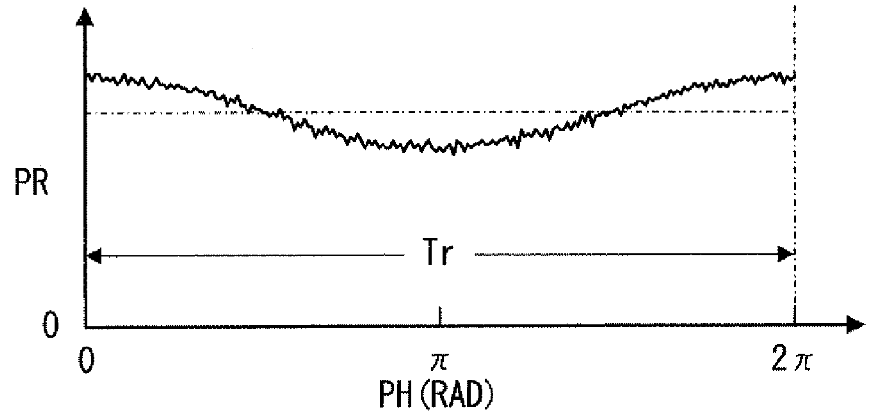
FIG. 9C illustrates a relationship between a phase and a pulse interval obtained based on the phase signal shown in FIG. 9B.

Here, FIG. 9A illustrates an example of a configuration of the length measuring roll 110 having an eccentricity, FIG. 9B illustrates an example of the phase signal Sp obtained by a single rotation of the length measuring roll 110 shown in FIG. 9A at the rotation period Tr, and FIG. 9C illustrates a relationship between a phase and an interval of adjacent pulses in the phase signal Sp (hereinafter, referred to as a pulse interval PR) obtained based on the phase signal Sp shown in FIG. 9B. It should be noted that the horizontal axis represents time t (sec) and the vertical axis represents an output value of the phase signal Sp in FIG. 9B. In FIG. 9C, the horizontal axis represents a phase PH (rad) and the vertical axis represents the pulse interval PR. In the exemplary embodiment, correlation data between the phase PH and each pulse interval PR in one rotation period Tr as shown in FIG. 9C is referred to as "pulse data."

In the example shown in FIG. 9A, the rotation axis 110*a* is attached to the length measuring roll 110. On this occasion, it is difficult to obtain a state having no eccentricity at all due to moderate accuracy of attachment or the like, thereby causing some eccentricity in most cases. Here, a shortest distance between the rotation axis 110*a* and the circumferential surface of the length measuring roll 110 is referred to as a shortest radius RS, while a longest distance therebetween is referred to as a longest radius RL. Further, the length of the circumferential surface of the length measuring roll 110 is referred to as a roll circumferential length Lr.

FIG. 9B exemplifies the phase signal Sp obtained by a single rotation of the length measuring roll 110 shown in FIG. 9A with a starting point at a position providing the longest radius RL. In the rotation period Tr, a time point from which the single rotation is started is referred to as a period starting time point tr1, and a time point at which the single rotation is ended is referred to as a period ending time point tr2. It should be noted that the period starting time point tr1 corresponds to the phase PH=0 (rad) shown in FIG. 9C and the period ending time point tr2 corresponds to the phase PH=2π (rad) shown in FIG. 9C. As described above, when the length measuring roll 110 having an eccentricity is used, the pulse interval PR in the phase signal Sp varies between the part of the shortest radius RS and the part of the longest radius RL of the length measuring roll 110. More specifically, at the part of the shortest radius RS, the pulse interval PR is reduced in comparison with that of the part of the longest radius RL.

Accordingly, in this example, as shown in FIG. 9C, the pulse interval PR shows the behavior that gradually reduces from the phase PH=0 toward the phase PH=2π, and thereafter, gradually increases from the phase PH=π toward the phase PH=2π like a sinusoidal wave. Further, jitter observed on the wave is caused by irregularities (manufacturing error) in the widths or intervals of the slits provided on the slit circular plate 220, which is unavoidable because of moderate accuracy of manufacturing. If the length measuring roll 110 is attached with a state of absolutely no eccentricity and the widths or intervals of the slits are completely uniform, FIG. 9C would show a line graph which is straight and parallel to the horizontal line.

Next, processing for detecting an abnormality that occurs in the length measuring device 100 having the length measuring roll 110 with an eccentricity will be described.

Figure 10:
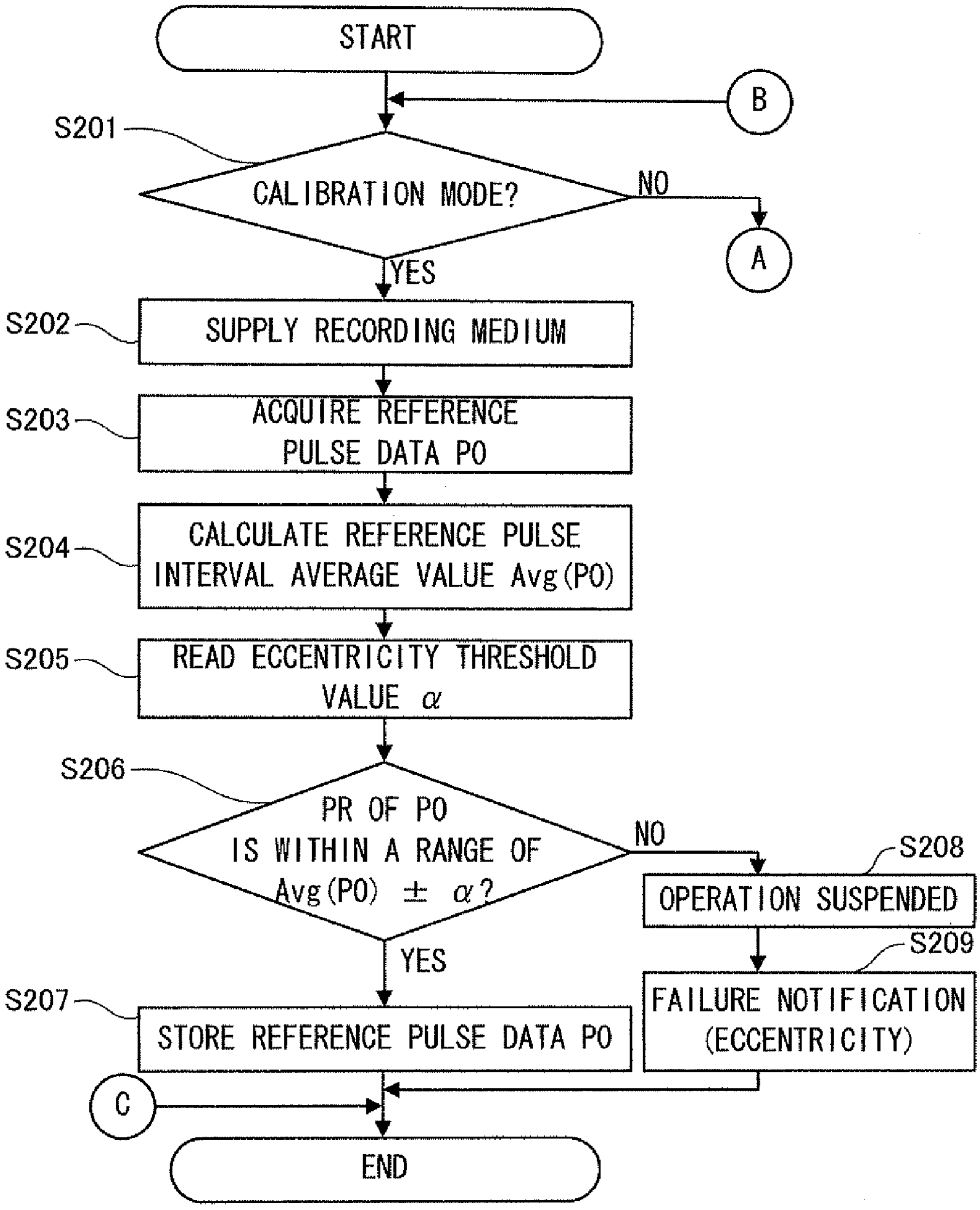
FIG. 10 is a flowchart illustrating an example of processing by the controller in detecting an abnormality in the length measuring device.
Figure 11:
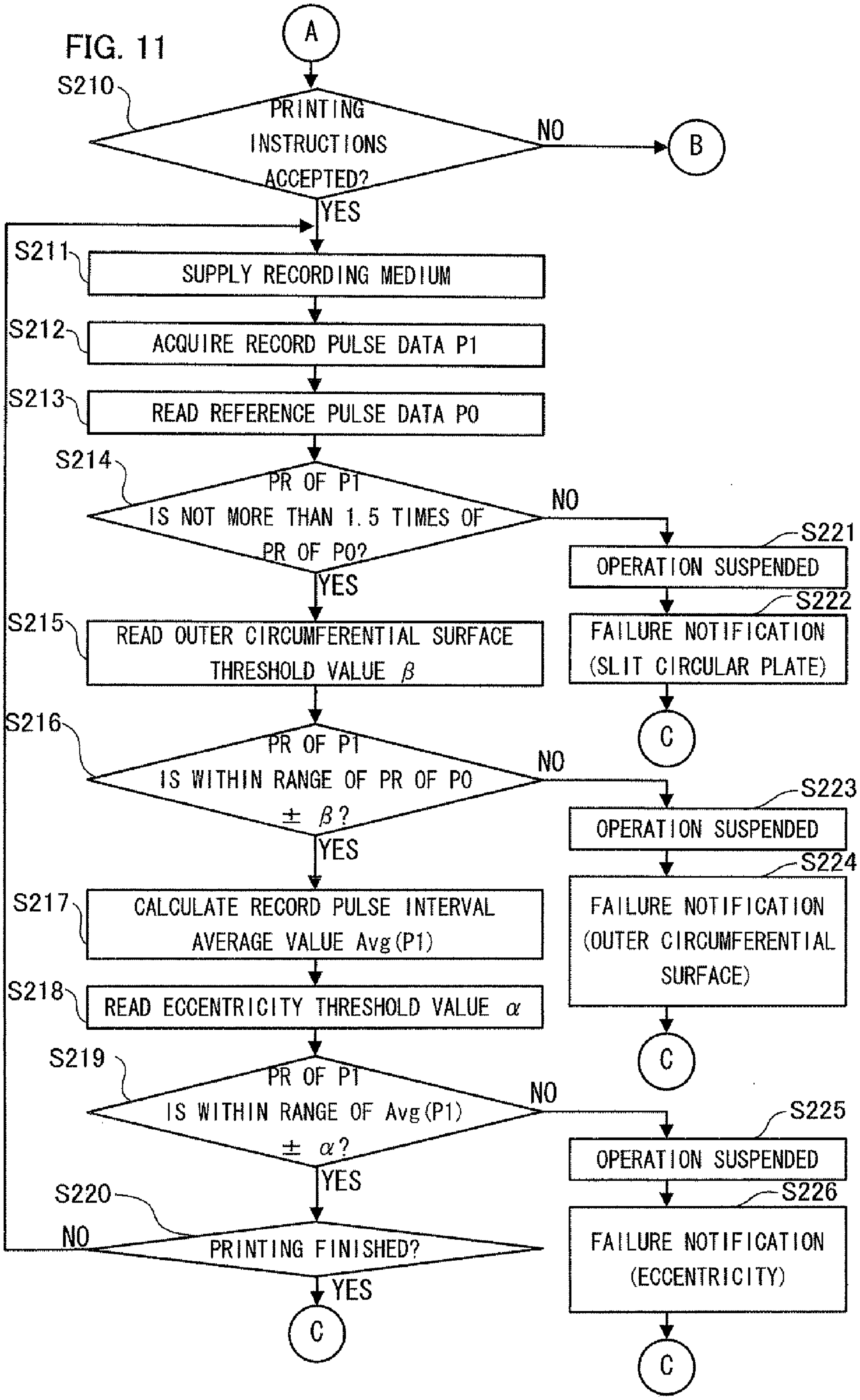
FIG. 11 is a flowchart (continuation) illustrating an example of processing by the controller in detecting the abnormality in the length measuring device.

FIGS. 10 and 11 are flowcharts illustrating an example of processing by the controller 80 in detecting the abnormality in the length measuring device 100.

In this processing, first, the acceptance portion 81 determines whether the image forming apparatus is set to a calibration mode or not (step 201). The calibration mode is set when, for example, a user or an engineer performs maintenance operations on the image forming apparatus. An input related to the calibration mode is accepted through the UI 90, for example. In the exemplary embodiment, the setting to the calibration mode is allowed in the case where no printing instruction for the recording medium S is provided.

In the case where an affirmative determination is made in step 201, the operation controller 84 causes the recording medium supplier 40 to start supplying the recording medium S (step 202). At this time, the recording medium S is transported at a predetermined recording medium transport speed Vs. It should be noted that the recording medium S used in the calibration mode may be the same as that used in the image forming operation, or may be the recording medium S that is set exclusively for the calibration mode.

The recording medium S passes through the length measuring device 100 as being transported. Then, in the length measuring device 100, the length measuring roll 110 rotates along with the transportation of the recording medium S in the same manner as the image forming operation, and thereby the phase signal Sp is outputted from the first slit detector 230 and the Z-phase signal Sz is outputted from the second slit detector 240. Further, along with the transportation of the recording medium S, the upstream side edge signal Su is outputted from the upstream side detecting sensor 160 and the downstream side edge signal Sd is outputted from the downstream side detecting sensor 170. Various signals outputted from the length measuring device 100 are inputted to the pulse data acquisition portion 87*a* through the recording medium length calculation portion 85. It should be noted that, in this description, the various signals are considered to be outputted according to the above-described timing chart shown in FIG. 6A.

Next, the pulse data acquisition portion 87*a* acquires reference pulse data P0 based on the various signals being inputted (step 203). The reference pulse data P0 having been acquired is outputted from the pulse data acquisition portion 87*a* to the determination portion 87*d*.

Here, procedures for acquiring the reference pulse data P0 will be described with reference to the timing chart shown in FIG. 6A. The pulse data acquisition portion 87*a* first obtains the third time point tc and the fourth time point td from the upstream side edge signal Su and the downstream side edge signal Sd, then obtains the fourth time period T4 from the third time point tc and the fourth time point td. With reference to the Z-phase signal Sz, the pulse data acquisition portion 87*a* next obtains the time point at which the Z-phase signal Sz rises (in the example shown in FIG. 6A, a first rising time point tra, a second rising time point trb, a third rising time point trc and a fourth rising time point trd) within the fourth time period T4. Subsequently, the pulse data acquisition portion 87*a* regards each of a period from the first rising time point tra to the second rising time point trb, a period from the second rising time point trb to the third rising time point trc and a period from the third rising time point trc to the fourth rising time point trd as the rotation period Tr of the length measuring roll 110, and obtains the phase signal Sp in each of the rotation period Tr, namely, the phase signal Sp for a single rotation of the length measuring roll 110. Here, the period from the first rising time point tra to the second rising time point trb is referred to as a first rotation period Tr1, the period from the second rising time point trb to the third rising time point trc is referred to as a second rotation period Tr2, and the period from the third rising time point trc to the fourth rising time point trd is referred to as a third rotation period Tr3.

Next, the pulse data acquisition portion 87*a* calculates first reference pulse data that indicates a relationship between the phase PH and the pulse interval PR in the first rotation period Tr1, second reference pulse data that indicates a relationship between the phase PH and the pulse interval PR in the second rotation period Tr2, and third reference pulse data that indicates a relationship between the phase PH and the pulse interval PR in the third rotation period Tr3. It should be noted that the first to third reference pulse data have the jitter due to the eccentricity in the length measuring roll 110 as shown in FIG. 9C.

Then the pulse data acquisition portion 87*a* acquires the reference pulse data P0 by averaging the first to third reference pulse data for each phase. The reference pulse data P0 also has the jitter as shown in FIG. 9C.

Returning to FIG. 10, the description will be continued.

The determination portion 87*d* calculates a reference pulse interval average value Avg(P0), which is an average value of the pulse interval PR in each phase, using the reference pulse data P0 acquired in step 203 (step 204). Subsequently, the determination portion 87*d* reads the eccentricity threshold value a from the threshold value memory 87*c* (step 205), and then calculates an allowable upper limit eccentricity value Avg(P0)+$\alpha$ by adding the eccentricity threshold value $\alpha$ to the reference pulse interval average value Avg(P0) and an allowable lower limit eccentricity value Avg(P0)−$\alpha$ by subtracting the eccentricity threshold value $\alpha$ from the reference pulse interval average value Avg(P0). The determination portion 87*d* then determines whether or not all of the pulse intervals PR of the reference pulse data P0 fall within a range that is not more than the allowable upper limit eccentricity value and not less than the allowable lower limit eccentricity value (step 206).

If an affirmative determination is made in step 206, the determination portion 87*d* stores the reference pulse data P0 acquired in step 203 in the reference pulse data memory 87*b* (step 207), thus completing the series of processes. Meanwhile, in the case where a negative determination is made in step 206, the determination portion 87*d* outputs a signal for suspending the operations of the image forming apparatus to the operation controller 84, and upon receiving the signal, the operation controller 84 suspends operations of each part constituting the image forming apparatus (step 208). Next, the determination portion 87*d* outputs a signal indicating that an abnormality occurs in the eccentricity in the length measuring roll 110 to the UI 90, and upon receiving the signal, the UI 90 notifies that a failure occurs due to an excessive eccentricity in the length measuring roll 110 (step 209), thus completing the series of processes.

Next, subsequent processing in the case where the negative determination is made in step 201 will be described mainly with reference to FIG. 11.

In the case where the negative determination is made in step 201, the acceptance portion 81 determines whether or not the image forming apparatus has accepted any print instructions (step 210). It should be noted that the print instructions here include not only instructions of image forming on both sides of a recording medium S, but also instructions of image forming on one side thereof. If a negative determination is made in step 210, the process returns to step 201 to be continued.

On the other hand, in the case where an affirmative determination is made in step 210, the operation controller 84 causes the recording medium supplier 40 to start supplying the recording medium S (step 211). At this time, the recording medium S is transported at a predetermined recording medium transport speed Vs. Further, though details are omitted, the recording medium S being transported is subjected to the image formation, the transfer, the fixing, the cooling and the like according to the above-described procedures. Accordingly, each of the processes subsequent to step 211 is performed in parallel to the calculation process of the recording medium length L in the background of the image forming operation.

The recording medium S on which an image is fixed passes through the length measuring device 100 as being transported. Then, in the length measuring device 100, the length measuring roll 110 rotates along with the transportation of the recording medium S, the phase signal Sp is outputted from the first slit detector 230 and the Z-phase signal Sz is outputted from the second slit detector 240 as described above. Further, as the recording medium S is transported, the upstream side edge signal Su is outputted from the upstream side detecting sensor 160 and the downstream side edge signal Sd is outputted from the downstream side detecting sensor 170. Various signals outputted from the length measuring device 100 are inputted to the pulse data acquisition portion 87*a* through the recording medium length calculation portion 85. It should be noted that, in this description also, the various signals are considered to be outputted according to the above-described timing chart shown in FIG. 6A.

Next, the pulse data acquisition portion 87*a* acquires record pulse data P1, as an example of new periodic information, based on the various signals being inputted (step 212). The record pulse data P1 having been acquired is outputted from the pulse data acquisition portion 87*a* to the determination portion 87*d*.

Since the calculation procedures of the record pulse data P1 in step 212 is the same manner as the above-described acquisition procedures of the reference pulse data P0 in step 203, the detailed description of the calculation procedures is omitted. Accordingly, the record pulse data P1 acquired in step 212 also has jitter due to the eccentricity in the length measuring roll 110 as shown in FIG. 9C.

However, the record pulse data P1 and the reference pulse data P0 are different in that the recording medium S to be measured is different. Further, in the calibration mode in which the reference pulse data P0 is obtained, the recording medium S on which no image has been formed is used. In contrast thereto, there is also a difference in that, when the record pulse data P1 is to be obtained, the recording medium S on which an image has been formed is used. Moreover, as will be understood, the record pulse data P1 is different from the reference pulse data P0 in that the record pulse data P1 is able to be obtained during the image forming operations other than the calibration mode while the reference pulse data P0 is obtained within the period of performing the calibration mode.

The determination portion 87*d* then reads the reference pulse data P0 stored in the reference pulse data memory 87*b* in step 207 (step 213).

Next, the determination portion 87*d* calculates an allowable upper limit slit value by multiplying each of the pulse intervals PR in the reference pulse data P0 read in step 213 by a factor of 1.5. Thereafter, the determination portion 87*d* determines whether or not all the pulse intervals PR in the record pulse data P1 is not more than the allowable upper limit slit value (step 214).

In the case where an affirmative determination is made in step 214, the determination portion 87*d* then reads the outer circumferential surface threshold value β from the threshold value memory 87*c* (step 215), and calculates an allowable upper limit outer circumferential surface value P0+β by adding the outer circumferential surface threshold value β to each of the pulse intervals PR in the reference pulse data P0 and an allowable lower limit outer circumferential surface value P0−β by subtracting the outer circumferential surface threshold value β from each of the pulse intervals PR in the reference pulse data P0. Thereafter, the determination portion 87*d* determines whether or not all of the pulse intervals PR of the record pulse data P1 fall within a range that is not more than the allowable upper limit outer circumferential surface value and not less than the allowable lower limit outer circumferential surface value (step 216).

If an affirmative determination is made in step 216, the determination portion 87*d* calculates a record pulse interval average value Avg(P1), which is an average value of the pulse interval PR in each phase, using the record pulse data P1 acquired in step 212 (step 217). Subsequently, the determination portion 87*d* reads the eccentricity threshold value α from the threshold value memory 87*c* (step 218), and then calculates an allowable upper limit eccentricity value Avg (P1)+α by adding the eccentricity threshold value α to the record pulse interval average value Avg(P1) and an allowable lower limit eccentricity value Avg(P1)−α by subtracting the eccentricity threshold value α from the record pulse interval average value Avg(P1). The determination portion 87*d* then determines whether or not all of the pulse intervals PR of the record pulse data P1 fall within a range that is not more than the allowable upper limit eccentricity value and not less than the allowable lower limit eccentricity value (step 219).

In the case where an affirmative determination is made in step 219, the acceptance portion 81 determines whether or not printing by the image forming apparatus has been finished (step 220). If an affirmative determination is made in step 220, the series of processes is completed. Meanwhile, in the case where a negative determination is made in step 219, the process returns to step 211 to be continued.

On the other hand, in the case where a negative determination is made in step 214, the determination portion 87*d* outputs a signal for suspending the operations of the image forming apparatus to the operation controller 84, and upon receiving the signal, the operation controller 84 suspends operations of each part constituting the image forming apparatus (step 221). Next, the determination portion 87*d* outputs a signal indicating that an abnormality occurs in the slit circular plate 220 provided in the rotation amount detector 200 to the UI 90, and upon receiving the signal, the UI 90 notifies that a failure occurs in the slit circular plate 220 due to a fracture or the like (step 222), thus completing the series of processes.

Further, in the case where a negative determination is made in step 216, the determination portion 87*d* outputs a signal for suspending the operations of the image forming apparatus to the operation controller 84, and upon receiving the signal, the operation controller 84 suspends operations of each part constituting the image forming apparatus (step 223). Next, the determination portion 87*d* outputs a signal indicating that an abnormality occurs on the outer circumferential surface of the length measuring roll 110 to the UI 90, and upon receiving the signal, the UI 90 notifies that a failure occurs due to foreign substances adhering to the outer circumferential surface of the length measuring roll 110 (step 224), thus completing the series of processes.

Still further, in the case where a negative determination is made in step 219, the determination portion 87*d* outputs a signal for suspending the operations of the image forming apparatus to the operation controller 84, and upon receiving the signal, the operation controller 84 suspends operations of each part constituting the image forming apparatus (step 225). Next, the determination portion 87*d* outputs a signal indicating that an abnormality occurs in the eccentricity in the length measuring roll 110 to the UI 90, and upon receiving the signal, the UI 90 notifies that a failure occurs due to an excessive eccentricity in the length measuring roll 110 (step 226), thus completing the series of processes.

Figure 12A:
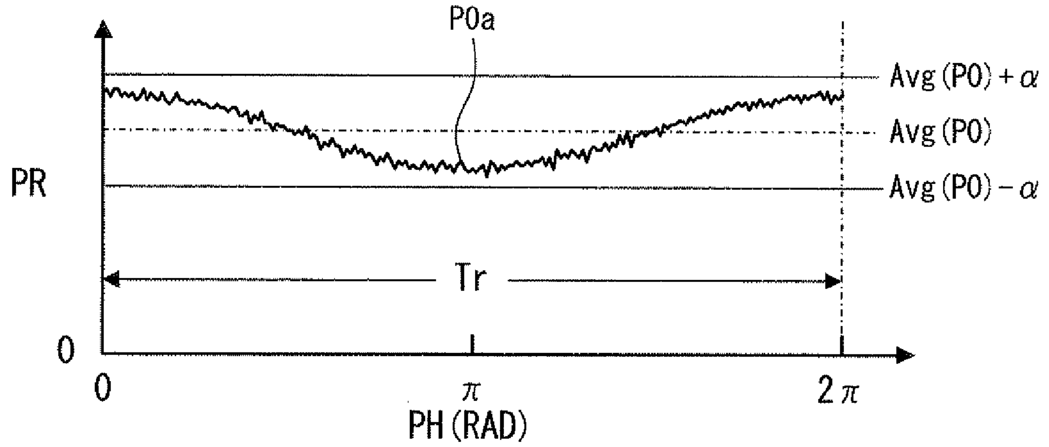
FIGS. 12A and 12B illustrate a failure determination process in step 206 shown in FIG. 10.
Figure 12B:
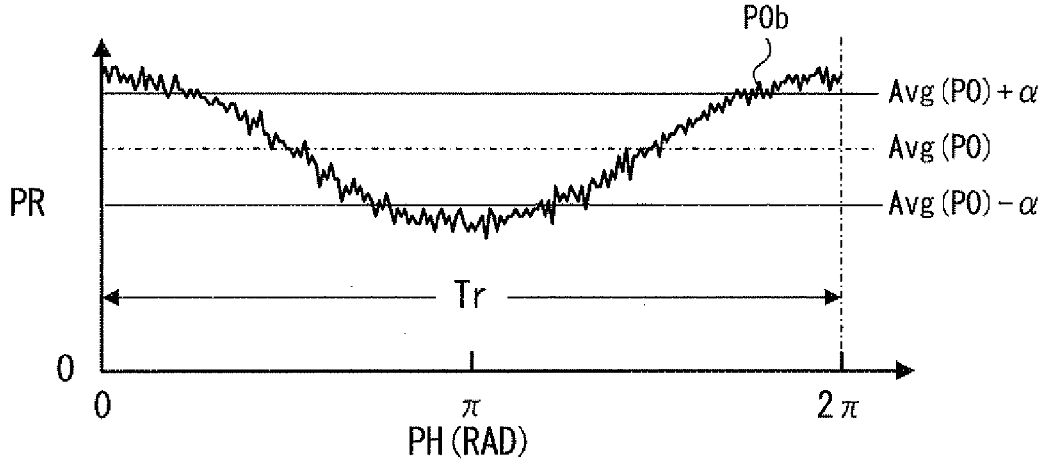

FIGS. 12A and 12B illustrate the failure determination process in the above-described step 206 (refer to FIG. 10).

FIG. 12A illustrates, in the case where the affirmative determination is made in step 206, an example of a relationship among: the reference pulse data P0; the reference pulse interval average value Avg(P0) obtained based on the reference pulse data P0; the allowable upper limit eccentricity value (Avg(P0)+α) and the allowable lower limit eccentricity value (Avg(P0)−α), both of which are obtained based on the reference pulse interval average value Avg(P0) and the eccentricity threshold value α. It should be noted that the reference pulse data P0 is depicted as "P0*a*" in FIG. 12A.

On the other hand, FIG. 12B illustrates, in the case where the negative determination is made in step 206, an example of a relationship among: the reference pulse data P0; the reference pulse interval average value Avg(P0) obtained based on the reference pulse data P0; the allowable upper limit eccentricity value and the allowable lower limit eccentricity value, both of which are obtained based on the reference pulse interval average value Avg(P0) and the eccentricity threshold value α. It should be noted that the reference pulse data P0 is depicted as "P0*b*" in FIG. 12B.

In the exemplary embodiment, if the length measuring roll 110 has an eccentricity in the length measuring device 100, a force exerted on the length measuring roll 110 through the coil spring 130 and the swing arm 120 varies between the case where the part of the longest radius RL of the length measuring roll 110 comes in contact with the recording medium S and the case where the part of the shortest radius RS of the length measuring roll 110 comes in contact with the recording medium S. More specifically, when the part of the longest radius RL of the length measuring roll 110 comes in contact with the recording medium S, a force applied from the length measuring roll 110 to the recording medium S is reduced compared to the case where the part of the shortest radius RS comes in contact with the recording medium S. This is because, in the case where the part of the longest radius RL of the length measuring roll 110 moves toward the position to be in contact with the recording medium S, the rotation axis 110*a* of the length measuring roll 110 moves upwardly (away from the recording medium S), and thereby a force to extend the coil spring 130 is applied to the coil spring 130 through the swing arm 120. Meanwhile, this is because, in the case where the part of the shortest radius RS of the length measuring roll 110 moves toward the position to be in contact with the recording medium S, the rotation axis 110*a* of the length measuring roll 110 moves downwardly (approaching the recording medium S), and thereby a force to compress the coil spring 130 is applied to the coil spring 130 through the swing arm 120.

If the force applied from the length measuring roll 110 to the recording medium S is reduced, an amount of deformation (amount of distortion) of the surface layer 112 constituting the length measuring roll 110 is decreased compared to the amount distortion before the force is reduced. On the other hand, if the force applied from the length measuring roll 110 to the recording medium S is increased, the amount of distortion of the surface layer 112 is increased in comparison with the amount of distortion before the force is increased. Here, in the case where the amount of distortion of the surface layer 112 is decreased, the roll circumferential length Lr is substantially reduced in comparison with the roll circumferential length Lr before the amount of distortion is decreased. In contrast to this, in the case where the amount of distortion of the surface layer 112 is increased, the roll circumferential length Lr is substantially increased in comparison with the roll circumferential length Lr before the amount of distortion is increased.

Then, in the case where the force applied from the length measuring roll 110 to the recording medium S largely varies periodically due to the eccentricity in the length measuring roll 110, an error component contained in the second length L2 through the pulse count number C is increased. As a result, an error component contained in the recording medium length L, which is obtained by using the second length L2, is also increased.

Accordingly, in the exemplary embodiment, to perform the calibration mode, the degree of eccentricity in the length measuring roll 110 is detected via the pulse intervals PR, and occurrence of abnormality is determined when variation of the pulse intervals PR due to the eccentricity goes beyond a predetermined range (between the allowable upper limit eccentricity value and the allowable lower limit eccentricity value). Especially, in the exemplary embodiment, the criterion for abnormality determination is established based on the reference pulse interval average value Avg(P0) obtained from the calculation result of the reference pulse data P0 and the predetermined eccentricity threshold value $\alpha$. Consequently, the eccentricity threshold value $\alpha$ is determined to be less than a level in which an effect thereof on the length measuring error of the length measuring roll 110 is not negligible. It should be noted that there is still an unavoidable possibility to include an effect of the eccentricity due to an error in attachment accuracy of the length measuring roll 110 or an effect of a manufacturing error in the widths or intervals of the slits provided in the slit circular plate 220 in the reference pulse data P0 per se stored in the reference pulse data memory 87*b*. However, these effects are of no matter as long as being suppressed to be correctable, and thereby these effects are not determined as abnormality.

Figure 13A:
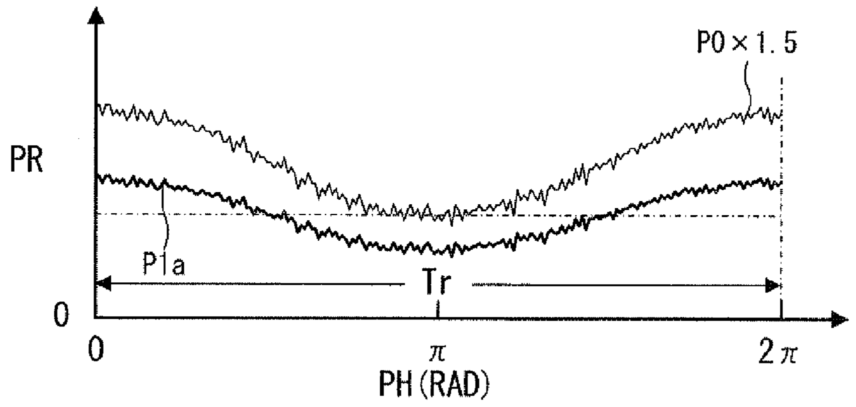
FIGS. 13A and 13B illustrate a failure determination process in step 214 shown in FIG. 11.
Figure 13B:
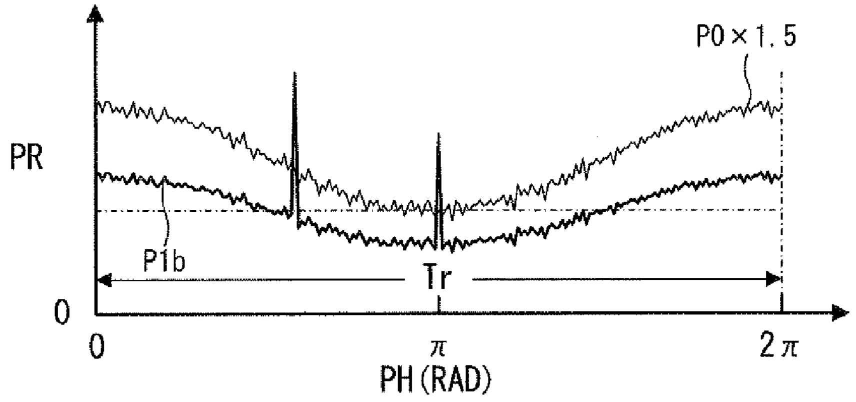

FIGS. 13A and 13B illustrate the failure determination process in the above-described step 214 (refer to FIG. 11).

FIG. 13A illustrates, in the case where the affirmative determination is made in step 214, an example of a relationship between the record pulse data P1 and the allowable upper limit slit value (P0×1.5). It should be noted that the record pulse data P1 is depicted as "P1*a*" in FIG. 13A.

On the other hand, FIG. 13B illustrates, in the case where the negative determination is made in step 214, an example of a relationship between the record pulse data P1 and the allowable upper limit slit value. It should be noted that the record pulse data P1 is depicted as "P1*b*" in FIG. 13B.

In the exemplary embodiment, a rotary encoder having the slit circular plate 220 is used as the rotation amount detector 200 of the length measuring device 100. Here, the phase signal Sp, which is a base for the record pulse data P1, is generated by the movement of the plural first slits 221 along with the rotation of the slit circular plate 220. However, in the case where the adjacent two first slits 221 become one due to, for example, fracture or cracking appeared in the slit circular plate 220, the number of pulses generated by passing through these two first slits 221 is reduced from two to one, thus reducing the pulse count number C as compared to the actual rotation amount.

Consequently, in the case where the pulse count number C is reduced due to the fracture or the like on the slit circular plate 220, the error component contained in the second length L2 through the pulse count number C is increased. As a result, the error component contained in the recording medium length L, which is obtained by using the second length L2, is also increased.

Accordingly, in the exemplary embodiment, during the image forming operations are performed, conditions of the first slits 221 provided on the slit circular plate 220 is detected via the pulse intervals PR, and occurrence of abnormality is determined when variation of the pulse intervals PR goes beyond a predetermined upper limit (the allowable upper limit slit value). Especially, in the exemplary embodiment, the criterion for abnormality determination is established to be 1.5 times the reference pulse data P0. This is because, for example, in the case where the adjacent two first slits 221 become one in the slit circular plate 220, the pulse interval PR on that occasion is almost doubled as compared to the pulse interval PR before the two slits become one. This is also because, when the criterion for the abnormality determination is brought close to be 1.0 times the reference pulse data P0, there occurs a possibility that the pulse interval PR increased due to the eccentricity in the length measuring roll 110 is erroneously detected such as due to abnormality in the slit circular plate 220. Further, the reason why the reference pulse data P0, but not the reference pulse interval average value Avg(P0), is used for the abnormality detection is also that there occurs a possibility that the pulse interval PR increased due to the eccentricity in the length measuring roll 110 is erroneously detected such as due to abnormality in the slit circular plate 220. Accordingly, the criterion for the abnormality determination may be more than 1.0 times the reference pulse data P0 and less than 2.0 times the reference pulse data P0.

Figure 14A:
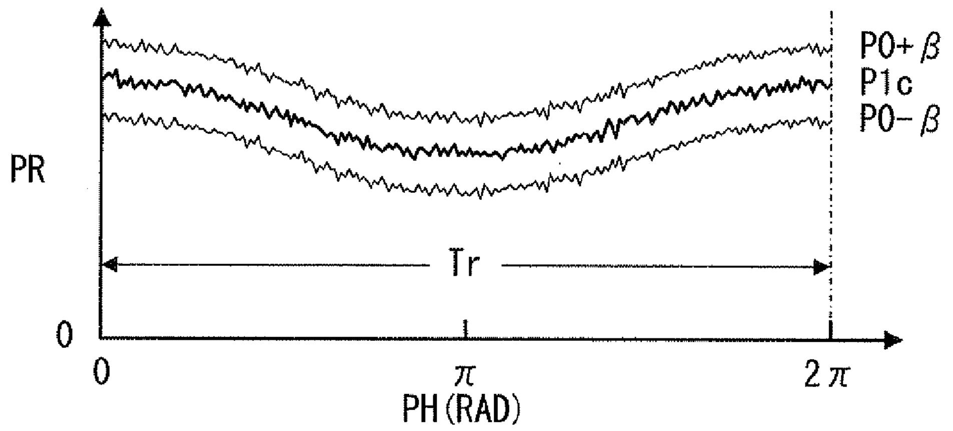
FIGS. 14A to 14C illustrate a failure determination process in step 216 shown in FIG. 11.
Figure 14B:
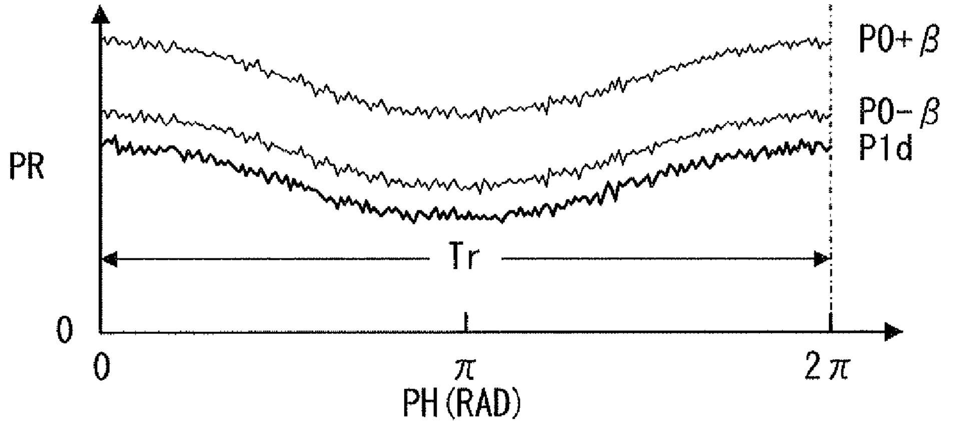
Figure 14C:
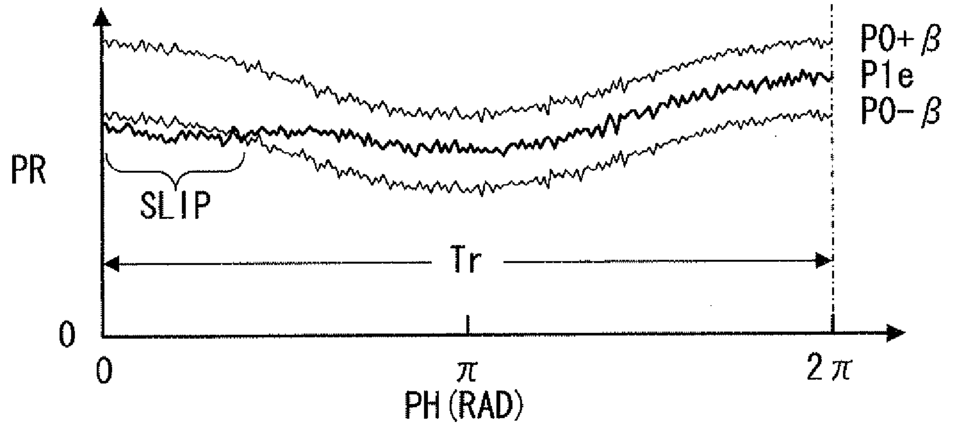

FIGS. 14A to 14C illustrate the failure determination process in the above-described step 216 (refer to FIG. 11).

FIG. 14A illustrates, in the case where the affirmative determination is made in step 216, an example of a relationship among: the record pulse data P1; the allowable upper limit outer circumferential surface value (P0+$\beta$); and the allowable lower limit outer circumferential surface value (P0−$\beta$). It should be noted that the record pulse data P1 is depicted as "P1*c*" in FIG. 14A.

On the other hand, FIGS. 14B and 14C illustrate, in the case where the negative determination is made in step 216, an example of a relationship among: the record pulse data P1; the allowable upper limit outer circumferential surface value; and the allowable lower limit outer circumferential surface value. It should be noted that the record pulse data P1 is depicted as "P1*d*" in FIG. 14B, and "P1*e*" in FIG. 14C.

In the exemplary embodiment, the state of the surface layer 112, which is provided on the outer circumferential surface of the length measuring roll 110 and comes in contact with the recording medium S, is changed as the number of measuring the length of the recording medium S by the length measuring roll 110 is increased. For example, in the case where the surface layer 112 wears by the contact with the recording medium S, the diameter of the length measuring roll 110 is reduced. On the other hand, in the case where paper debris of the recording medium S or toner particles of an image formed on the recording medium S are transferred and adhere to the surface layer 112 by the contact with the recording medium S, the diameter of the length measuring roll 110 is increased in some cases.

For example, if the diameter of the length measuring roll 110 becomes shorter than the original diameter thereof in the length measuring device 100 as the former, the roll circumferential length Lr of the length measuring roll 110 is reduced. Then, in the case where the roll circumferential length is reduced compared to that at the outset, a distance which the outer circumferential surface of the length measuring roll 110 moves in the same pulse interval PR, namely, the unit moving length is reduced accordingly.

Then the pulse count number C increases because the actual unit moving length becomes shorter as compared to a predetermined unit moving length X, and thereby the error component contained in the second length L2 through the pulse count number C is increased. As a result, the error component contained in the recording medium length L, which is obtained by using the second length L2, is also increased. In this case, the recording medium length L calculated by the length measuring device 100 is longer than in reality.

Further, for example, if the diameter of the length measuring roll 110 becomes longer than the original diameter thereof in the length measuring device 100 as the latter, a phenomenon opposite to that described above occurs. As a result, the error component contained in the recording medium length L, which is obtained by using the second length L2, is increased. In this case, the recording medium length L calculated by the length measuring device 100 is shorter than in reality. Here, FIG. 14B exemplifies the case where all pieces of the record pulse data P1*d* fall below the allowable lower limit outer circumferential surface value since the diameter of the length measuring roll 110 is considerably reduced compared to the original diameter thereof. Further, though not shown, in the case where the diameter of the length measuring roll 110 becomes considerably longer, for example, all pieces of the record pulse data P1*d* go beyond the allowable upper limit outer circumferential surface value.

Meanwhile, there is a case where foreign substances locally adhere to the outer circumferential surface of the length measuring roll 110 as the length measuring roll 110 is used. It should be noted that, as the term "foreign substance" here, paper debris of the recording medium S, oil adhering to the recording medium S by the fixing device 50, and so forth may be named, for example. In the case where the foreign substances thus locally adhere to the outer circumferential surface of the length measuring roll 110, a slippage between the length measuring roll 110 and the recording medium S occurs at the location in some cases.

If the slippage locally occurs at a part of the outer circumferential surface of the length measuring roll 110 in the length measuring device 100, the phase signal Sp at the part becomes substantially the same as that in the case where the diameter of the length measuring roll 110 is reduced. As a result, the error component contained in the recording medium length L, which is obtained by using the second length L2, is increased.

Here, FIG. 14C exemplifies the case where the record pulse data P1*d* partially falls below the allowable lower limit outer circumferential surface value since a slippage occurs in the length measuring roll 110 at the part shown as "slip" in the figure.

Accordingly, in the exemplary embodiment, during the image forming operations are performed, the degree of speed variation of the length measuring roll 110 is detected via the pulse intervals PR, and occurrence of abnormality is determined when variation of the pulse intervals PR due to the speed variation goes beyond a predetermined range (between the allowable upper limit outer circumferential surface value and the allowable lower limit outer circumferential surface value). Especially, in the exemplary embodiment, the criterion for abnormality determination is established based on the reference pulse data P0 and the predetermined outer circumferential surface threshold value $\beta$. Consequently, the outer circumferential surface threshold value $\beta$ is determined to be less than a level in which an effect thereof on the length measuring error of the recording medium length L is not negligible. It should be noted that the reference pulse data P0, but not the reference pulse interval average value Avg(P0), is used for the abnormality detection because the pulse interval PR increased or decreased due to the eccentricity in the length measuring roll 110 is erroneously detected such as due to abnormality in the outer circumferential surface of the length measuring roll 110, if the reference pulse interval average value Avg(P0) is employed.

Figure 15A:
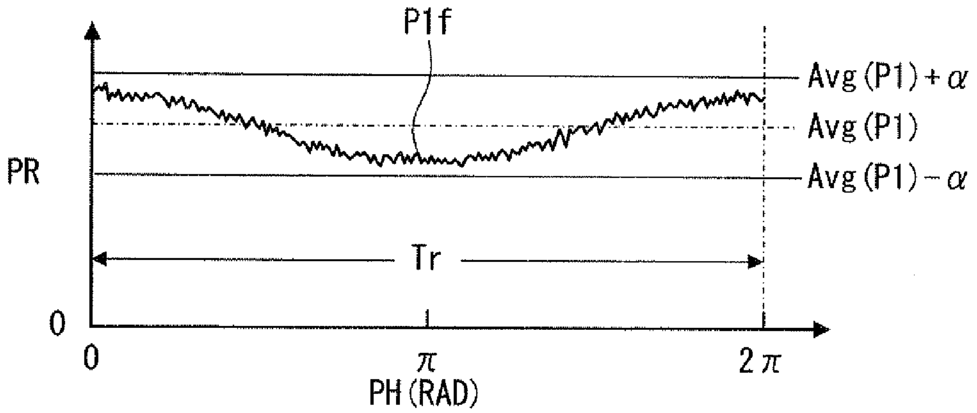
FIGS. 15A and 15B illustrate a failure determination process in step 219 shown in FIG. 11.
Figure 15B:
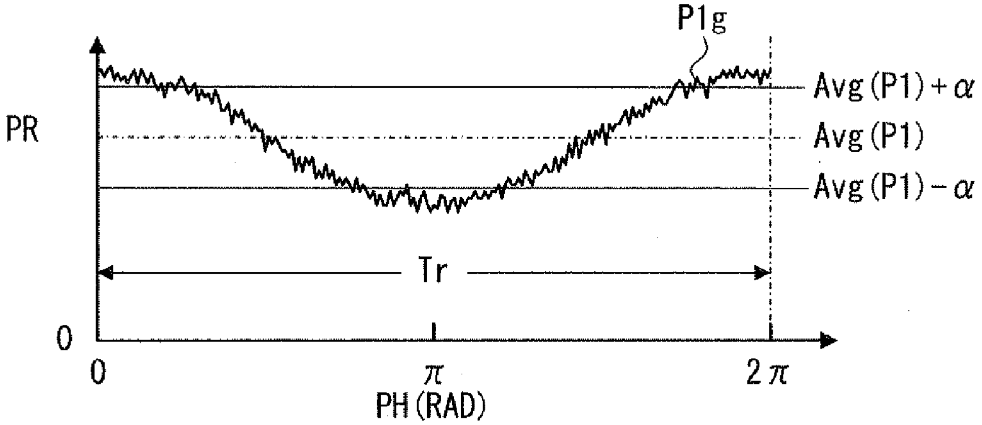

FIGS. 15A and 15B illustrate the failure determination process in the above-described step 219 (refer to FIG. 11).

FIG. 15A illustrates, in the case where the affirmative determination is made in step 219, an example of a relationship among: the record pulse data P1; the record pulse interval average value Avg(P1) obtained based on the record pulse data P1; the allowable upper limit eccentricity value (Avg(P1)+$\alpha$) and the allowable lower limit eccentricity value (Avg(P1)−$\alpha$), both of which are obtained based on the record pulse interval average value Avg(P1) and the eccentricity threshold value $\alpha$. It should be noted that the record pulse data P1 is depicted as "P1*f*" in FIG. 15A.

On the other hand, FIG. 15B illustrates, in the case where the negative determination is made in step 219, an example of a relationship among: the record pulse data P1; the record pulse interval average value Avg(P1) obtained based on the record pulse data P1; the allowable upper limit eccentricity value and the allowable lower limit eccentricity value, both of which are obtained based on the record pulse interval average value Avg(P1) and the eccentricity threshold value $\alpha$. It should be noted that the record pulse data P1 is depicted as "P1*g*" in FIG. 15B.

Since the failure determination process in step 219 is the same as that in the above-described step 216 except that the record pulse data P1 is used in place of the reference pulse data P0, the detailed description thereof is omitted.

Figure 16:
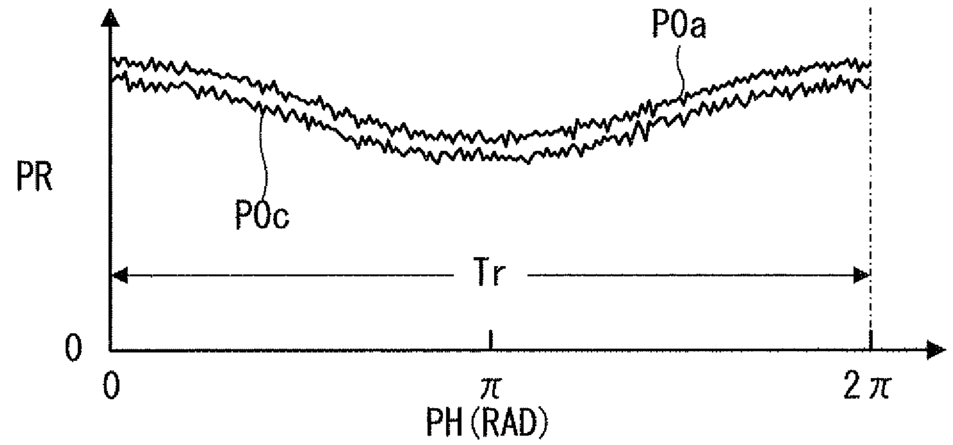
FIG. 16 illustrates an update process of the reference pulse data.

FIG. 16 illustrates an update process of the reference pulse data P0. In the figure, the reference pulse data P0 before updating is depicted as "P0*a*," and the reference pulse data P0 after updating is depicted as "P0*c*."

As has been described with reference to FIG. 10, in the exemplary embodiment, the reference pulse data P0 is obtained every time the calibration mode is set. If it is determined that there occurs no abnormality in the failure determination based on the reference pulse data P0, the update of the reference pulse data P0 is performed by overwriting of the former-obtained reference pulse data P0 (the reference pulse data P0*a* before updating) stored in the reference pulse data memory 87*b* with the later-obtained reference pulse data P0 (the reference pulse data P0*c* after updating).

It should be noted that, in the exemplary embodiment, the description has been made for the case where the length in the transport direction of the recording medium S is measured by arranging the length measuring roll 110, as an example of a rotation body, to come in contact with the recording medium S being transported. However, the way of using the rotation body is not limited thereto. For example, the rotation body may be used as a speed detector that detects a transport speed of a sheet based on the detecting result of an amount of rotation of the length measuring roll 110, or as a position detector that detects a position in the transport direction of a recording medium that passes through a part facing the length measuring roll 110.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An abnormality detecting device for a rotation body, comprising:
- a rotation body that rotates while coming in contact with a sheet being transported at a predetermined speed;
- an output unit that outputs a plurality of pulses of a number in proportion to an amount of rotation of the rotation body along with the rotation of the rotation body;
- an acquisition unit that acquires periodic information in which a position of the rotation body during a single rotation of the rotation body and a period of each of the pulses corresponding to the position are associated with each other, the periodic information being acquired based on the plurality of pulses outputted from the output unit along with the rotation of the rotation body at the predetermined speed;
- a memory that stores the periodic information acquired by the acquisition unit as reference periodic information; and
- an abnormality detector that detects an abnormality occurred in at least one of the rotation body and the output unit based on the reference periodic information read from the memory and new periodic information that is acquired after the reference periodic information is acquired.

2. The abnormality detecting device for a rotation body according to claim 1, wherein the abnormality detector sets an allowable range corresponding to an abnormality of each type based on the reference periodic information read from the memory, and detects the abnormality of a corresponding type in a case where the new periodic information acquired by the acquisition unit goes beyond the allowable range.

3. The abnormality detecting device for a rotation body according to claim 2, wherein the abnormality detector sets an upper limit of the allowable range by multiplication of a period of each pulse in the reference periodic information by a predetermined value, and detects an abnormality in the output unit in a case where a period of each pulse in the new periodic information goes beyond the allowable range.

4. The abnormality detecting device for a rotation body according to claim 2, wherein the abnormality detector sets an upper limit of the allowable range by adding a predetermined value to a period of each pulse in the reference periodic information and a lower limit of the allowable range by subtracting the predetermined value from the period of each pulse in the reference periodic information, and detects an abnormality in the rotation body in a case where a period of each pulse in the new periodic information goes beyond the allowable range.

5. The abnormality detecting device for a rotation body according to claim 2, wherein the abnormality detector obtains an average value of a period of each of the pulses in the new periodic information by an arithmetic mean and sets an upper limit of the allowable range by adding a predetermined value to the average value and a lower limit of the allowable range by subtracting the predetermined value from the average value, and detects an abnormality in the rotation body in a case where a period of each pulse in the new periodic information goes beyond the allowable range.

6. The abnormality detecting device for a rotation body according to claim 2, wherein the abnormality detector obtains an average value of a period of each of the pulses in the periodic information acquired by the acquisition unit by an arithmetic mean and sets an upper limit of a second allowable range by adding a predetermined value to the average value and a lower limit of the second allowable range by subtracting the predetermined value from the average value, and detects an abnormality in the rotation body in a case where a period of each pulse in the new periodic information goes beyond the second allowable range, and prohibits writing of the periodic information as the reference periodic information into the memory.

7. The abnormality detecting device for a rotation body according to claim 3, wherein the abnormality detector sets an upper limit of the allowable range by adding a predetermined value to a period of each pulse in the reference periodic information and a lower limit of the allowable range by subtracting the predetermined value from the period of each pulse in the reference periodic information, and detects an abnormality in the rotation body in a case where a period of each pulse in the new periodic information goes beyond the allowable range.

8. The abnormality detecting device for a rotation body according to claim 3, wherein the abnormality detector obtains an average value of a period of each of the pulses in the new periodic information by an arithmetic mean and sets an upper limit of the allowable range by adding a predetermined value to the average value and a lower limit of the allowable range by subtracting the predetermined value from the average value, and detects an abnormality in the rotation body in a case where a period of each pulse in the new periodic information goes beyond the allowable range.

9. The abnormality detecting device for a rotation body according to claim 3, wherein the abnormality detector obtains an average value of a period of each of the pulses in the periodic information acquired by the acquisition unit by an arithmetic mean and sets an upper limit of a second allowable range by adding a predetermined value to the average value and a lower limit of the second allowable range by subtracting the predetermined value from the average value, and detects an abnormality in the rotation body in a case where a period of each pulse in the new periodic information goes beyond the second allowable range, and prohibits writing of the periodic information as the reference periodic information into the memory.

10. The abnormality detecting device for a rotation body according to claim 4, wherein the abnormality detector obtains an average value of a period of each of the pulses in the new periodic information by an arithmetic mean and sets an upper limit of the allowable range by adding a predetermined value to the average value and a lower limit of the allowable range by subtracting the predetermined value from the average value, and detects an abnormality in the rotation body in a case where a period of each pulse in the new periodic information goes beyond the allowable range.

11. The abnormality detecting device for a rotation body according to claim 4, wherein the abnormality detector obtains an average value of a period of each of the pulses in the periodic information acquired by the acquisition unit by an arithmetic mean and sets an upper limit of a second allowable range by adding a predetermined value to the average value and a lower limit of the second allowable range by subtracting the predetermined value from the average value, and detects an abnormality in the rotation body in a case where a period of each pulse in the new periodic information goes beyond the second allowable range, and prohibits writing of the periodic information as the reference periodic information into the memory.

12. The abnormality detecting device for a rotation body according to claim 7, wherein the abnormality detector obtains an average value of a period of each of the pulses in the new periodic information by an arithmetic mean and sets an upper limit of the allowable range by adding a predetermined value to the average value and a lower limit of the allowable range by subtracting the predetermined value from the average value, and detects an abnormality in the rotation body in a case where a period of each pulse in the new periodic information goes beyond the allowable range.

13. The abnormality detecting device for a rotation body according to claim 5, wherein the abnormality detector obtains an average value of a period of each of the pulses in the periodic information acquired by the acquisition unit by an arithmetic mean and sets an upper limit of a second allowable range by adding a predetermined value to the average value and a lower limit of the second allowable range by subtracting the predetermined value from the average value, and detects an abnormality in the rotation body in a case where a period of each pulse in the new periodic information goes beyond the second allowable range, and prohibits writing of the periodic information as the reference periodic information into the memory.

14. An abnormality detecting device for a rotation body, comprising:

a rotation body that rotates while coming in contact with a sheet being transported at a predetermined speed;

an output unit that outputs a plurality of pulses of a number in proportion to an amount of rotation of the rotation body along with the rotation of the rotation body;

an acquisition unit that acquires periodic information in which a position of the rotation body during a single rotation of the rotation body and a period of each of the pulses corresponding to the position are associated with each other, the periodic information being acquired based on the plurality of pulses outputted from the output unit along with the rotation of the rotation body at the predetermined speed;

a determination unit that determines whether or not the period of each of the pulses in the periodic information acquired by the acquisition unit is beyond an allowable range established based on the periodic information; and a notification unit that notifies occurrence of an abnormality in at least one of the rotation body and the output unit in a case where the determination unit determines that the period of each of the pulses is beyond the allowable range.

15. The abnormality detecting device for a rotation body according to claim 14, further comprising a suspending unit that suspends an operation to be performed based on an output result by the output unit in the case where the determination unit determines that the period of each of the pulses is beyond the allowable range.

16. An image forming apparatus comprising:

a rotation body that rotates while coming in contact with a sheet being transported at a predetermined speed;

an output unit that outputs pulses of a number in proportion to an amount of rotation of the rotation body along with the rotation thereof;

a calculation unit that performs calculation of a length in a transport direction of the sheet based on the number of the pulses outputted by the output unit;

an image forming unit that forms an image on the sheet based on the length in the transport direction of the sheet calculated by the calculation unit;

an acquisition unit that acquires periodic information in which a position of the rotation body during a single rotation thereof and a period of each of the pulses corresponding to the position are associated with each other, the periodic information being acquired based on the plurality of pulses outputted from the output unit along with the rotation of the rotation body at the predetermined speed;

a memory that stores the periodic information acquired by the acquisition unit as reference periodic information; and an abnormality detector that detects an abnormality occurred in at least one of the rotation body and the output unit based on the reference periodic information read from the memory and new periodic information that is acquired after the reference periodic information is acquired.

17. The image forming apparatus according to claim 16, wherein the abnormality detector sets an allowable range based on the reference periodic information read from the memory, and detects the abnormality in a case where the new periodic information acquired by the acquisition unit goes beyond the allowable range.

18. The image forming apparatus according to claim 16, further comprising a suspending unit that suspends an image forming operation by the image forming unit in the case where the abnormality detector detects the abnormality.

19. The image forming apparatus according to claim 16, wherein the image forming unit forms an image on one side of the sheet and adjusts an image forming condition based on the length in the transport direction of the sheet to form an image on the other side of the sheet that has been reversed.

20. The image forming apparatus according to claim 17, further comprising a suspending unit that suspends an image forming operation by the image forming unit in the case where the abnormality detector detects the abnormality.

* * * * *